(12) United States Patent
Erdogan et al.

(10) Patent No.: US 9,783,440 B2
(45) Date of Patent: *Oct. 10, 2017

(54) ENHANCED BIOSORPTION OF WASTEWATER ORGANICS USING DISSOLVED AIR FLOTATION WITH SOLIDS RECYCLE

(71) Applicant: EVOQUA WATER TECHNOLOGIES LLC, Warrendale, PA (US)

(72) Inventors: Argun O. Erdogan, New Berlin, WI (US); Michael L. Doyle, Wauwatosa, WI (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/056,348

(22) Filed: Feb. 29, 2016

(65) Prior Publication Data

US 2016/0200609 A1 Jul. 14, 2016

Related U.S. Application Data

(63) Continuation of application No. 14/268,907, filed on May 2, 2014, now Pat. No. 9,359,236, which is a
(Continued)

(51) Int. Cl.
*C02F 3/12* (2006.01)
*C02F 1/24* (2006.01)
(Continued)

(52) U.S. Cl.
CPC ............... *C02F 3/12* (2013.01); *C02F 1/24* (2013.01); *C02F 3/121* (2013.01); *C02F 3/301* (2013.01);
(Continued)

(58) Field of Classification Search
CPC ...... C02F 3/12; C02F 3/121; C02F 2001/007; C02F 2301/046; C02F 1/24; C02F 1/5236;
(Continued)

(56) References Cited

U.S. PATENT DOCUMENTS 1,712,258 A 5/1929 Compain
1,833,315 A 11/1931 Burhans
(Continued)

FOREIGN PATENT DOCUMENTS

CA 2149090 A1 11/1996
CN 1229403 A 9/1999
(Continued)

OTHER PUBLICATIONS

"Contrashear filter solutions for waste water," for Contra ShearTM, Jul. 29, 2005, p. 1 of 1, http://www.contrashear.co.nz/.
(Continued)

*Primary Examiner* — Fred Prince

(57) ABSTRACT

Systems and methods for treating wastewater including a dissolved air flotation operation performed upon a portion of a mixed liquor output from a contact tank prior to the mixed liquor entering a biological treatment tank.

14 Claims, 12 Drawing Sheets

Related U.S. Application Data continuation-in-part of application No. 13/210,487, filed on Aug. 16, 2011, now Pat. No. 8,808,544.

(60) Provisional application No. 61/374,910, filed on Aug. 18, 2010, provisional application No. 61/819,822, filed on May 6, 2013.

(51) Int. Cl.
  *C02F 3/30* (2006.01)
  *C02F 1/00* (2006.01)
  *C02F 1/52* (2006.01)

(52) U.S. Cl.
  CPC ............ *C02F 3/302* (2013.01); *C02F 1/5236* (2013.01); *C02F 2001/007* (2013.01); *C02F 2301/043* (2013.01); *C02F 2301/046* (2013.01); *Y02W 10/15* (2015.05)

(58) Field of Classification Search
  CPC .... C02F 3/301; C02F 3/302; C02F 2301/043; Y02W 10/15
  USPC ....... 210/605, 609, 612, 613, 623, 252, 259, 210/631
  See application file for complete search history.

(56) References Cited

U.S. PATENT DOCUMENTS

| | | |
|---|---|---|
| 2,259,688 A | 10/1941 | Genter |
| 2,359,004 A | 9/1944 | Schlenz et al. |
| 2,893,957 A | 7/1959 | Genter et al. |
| 2,964,194 A | 12/1960 | Oliver et al. |
| 3,047,492 A | 7/1962 | Gambrel |
| 3,163,601 A | 12/1964 | Erickson et al. |
| 3,192,155 A | 6/1965 | Bready et al. |
| 3,259,566 A | 7/1966 | Torpey |
| 3,331,512 A | 7/1967 | Vore |
| 3,363,770 A | 1/1968 | Glos, II |
| 3,369,668 A | 2/1968 | Glos, II |
| 3,544,476 A | 12/1970 | Aiba et al. |
| 3,595,537 A | 7/1971 | Kaelin |
| 3,610,419 A | 10/1971 | Vallee et al. |
| 3,617,540 A | 11/1971 | Bishop et al. |
| 3,643,803 A | 2/1972 | Glos, II |
| 3,756,946 A | 9/1973 | Levin et al. |
| 3,774,768 A | 11/1973 | Turner |
| 3,787,316 A | 1/1974 | Brink et al. |
| 3,907,672 A | 9/1975 | Milne |
| 3,948,779 A | 4/1976 | Jackson |
| 3,964,998 A | 6/1976 | Barnard |
| 4,042,493 A | 8/1977 | Matsch et al. |
| 4,056,465 A | 11/1977 | Spector |
| 4,132,638 A | 1/1979 | Carlsson |
| 4,139,472 A | 2/1979 | Simonson |
| 4,141,822 A | 2/1979 | Levin et al. |
| 4,160,724 A | 7/1979 | Laughton |
| 4,162,153 A | 7/1979 | Spector |
| 4,162,982 A | 7/1979 | Chesner |
| 4,173,531 A | 11/1979 | Matsch et al. |
| 4,180,459 A | 12/1979 | Zievers |
| 4,256,580 A | 3/1981 | Rimmele |
| 4,267,038 A | 5/1981 | Thompson |
| 4,268,385 A | 5/1981 | Yoshikawa |
| 4,271,026 A | 6/1981 | Chen et al. |
| 4,277,342 A | 7/1981 | Hayes et al. |
| 4,279,753 A | 7/1981 | Nielson et al. |
| 4,284,510 A | 8/1981 | Savard et al. |
| 4,323,367 A | 4/1982 | Ghosh |
| 4,330,405 A | 5/1982 | Davis et al. |
| 4,346,008 A | 8/1982 | Leighton et al. |
| 4,351,729 A | 9/1982 | Witt |
| 4,370,233 A | 1/1983 | Hayes et al. |
| 4,374,730 A | 2/1983 | Braha et al. |
| 4,407,717 A | 10/1983 | Teletzke et al. |
| 4,442,005 A | 4/1984 | Breider |
| 4,491,522 A | 1/1985 | Ishida et al. |
| 4,522,722 A | 6/1985 | Nicholas |
| 4,527,947 A | 7/1985 | Elliott |
| 4,537,682 A | 8/1985 | Wong-Chong |
| 4,548,715 A | 10/1985 | Stein |
| 4,568,457 A | 2/1986 | Sullivan |
| 4,568,462 A | 2/1986 | Bohnke et al. |
| 4,599,167 A | 7/1986 | Benjes et al. |
| 4,632,758 A | 12/1986 | Whittle |
| 4,643,830 A | 2/1987 | Reid |
| 4,655,920 A | 4/1987 | Ragnegard |
| 4,663,044 A | 5/1987 | Goronszy |
| 4,664,804 A | 5/1987 | Morper et al. |
| RE32,429 E | 6/1987 | Spector |
| 4,675,114 A | 6/1987 | Zagyvai et al. |
| 4,705,633 A | 11/1987 | Bogusch |
| 4,710,301 A | 12/1987 | Geuens |
| 4,731,185 A | 3/1988 | Chen et al. |
| 4,780,198 A | 10/1988 | Crawford et al. |
| 4,790,939 A | 12/1988 | Suzuki et al. |
| 4,797,212 A | 1/1989 | von Nordenskjold |
| 4,814,093 A | 3/1989 | Frykhult |
| 4,818,391 A | 4/1989 | Love |
| 4,838,910 A | 6/1989 | Stollenwerk et al. |
| 4,842,732 A | 6/1989 | Tharp |
| 4,849,108 A | 7/1989 | de Wilde et al. |
| 4,865,732 A | 9/1989 | Garrant et al. |
| 4,867,883 A | 9/1989 | Daigger et al. |
| 4,874,519 A | 10/1989 | Williamson |
| 4,891,136 A | 1/1990 | Voyt |
| 4,915,840 A | 4/1990 | Rozich |
| 4,950,403 A | 8/1990 | Hauff et al. |
| 4,956,094 A | 9/1990 | Levin et al. |
| 4,961,854 A | 10/1990 | Wittmann et al. |
| 4,975,197 A | 12/1990 | Wittmann et al. |
| 4,999,111 A | 3/1991 | Williamson |
| 5,013,442 A | 5/1991 | Davis et al. |
| 5,019,266 A | 5/1991 | Soeder et al. |
| 5,022,993 A | 6/1991 | Williamson |
| 5,051,191 A | 9/1991 | Rasmussen et al. |
| 5,068,036 A | 11/1991 | Li et al. |
| 5,076,924 A | 12/1991 | Persson et al. |
| 5,084,174 A | 1/1992 | Perala et al. |
| 5,087,358 A | 2/1992 | Massignani |
| 5,094,752 A | 3/1992 | Davis et al. |
| 5,098,567 A | 3/1992 | Nishiguchi |
| 5,098,572 A | 3/1992 | Faup et al. |
| 5,114,587 A | 5/1992 | Hagerstedt |
| 5,126,049 A | 6/1992 | Hallberg |
| 5,128,040 A | 7/1992 | Molof et al. |
| 5,137,636 A | 8/1992 | Bundgaard |
| 5,151,187 A | 9/1992 | Behmann |
| 5,182,021 A | 1/1993 | Spector |
| 5,213,681 A | 5/1993 | Kos |
| 5,227,065 A | 7/1993 | Strid |
| 5,234,595 A | 8/1993 | DiGregorio et al. |
| 5,242,590 A | 9/1993 | Thomson et al. |
| 5,246,585 A | 9/1993 | Meiring |
| 5,248,422 A | 9/1993 | Neu |
| 5,254,253 A | 10/1993 | Behmann |
| 5,282,980 A | 2/1994 | Kew et al. |
| 5,288,405 A | 2/1994 | Lamb, III |
| 5,288,406 A | 2/1994 | Stein |
| 5,296,143 A | 3/1994 | Frykhult |
| 5,304,308 A | 4/1994 | Tsumura et al. |
| 5,306,422 A * | 4/1994 | Krofta ................ B01D 21/0045 210/151 |
| 5,316,682 A | 5/1994 | Keyser et al. |
| 5,330,645 A | 7/1994 | Geldmacher |
| 5,330,646 A | 7/1994 | Frykhult |
| 5,336,290 A | 8/1994 | Jermstad |
| 5,342,522 A | 8/1994 | Marsman et al. |
| 5,348,653 A | 9/1994 | Rovel |
| 5,348,655 A | 9/1994 | Simas et al. |
| 5,356,537 A | 10/1994 | Thurmond et al. |
| 5,376,242 A | 12/1994 | Hayakawa |
| 5,380,438 A | 1/1995 | Nungesser |
| 5,389,258 A | 2/1995 | Smis et al. |

(56) References Cited

U.S. PATENT DOCUMENTS

| | | |
|---|---|---|
| 5,480,548 A | 1/1996 | Daigger et al. |
| 5,482,630 A | 1/1996 | Lee et al. |
| 5,505,862 A | 4/1996 | Sonnenrein |
| 5,514,277 A | 5/1996 | Khudenko |
| 5,514,278 A | 5/1996 | Khudenko |
| 5,531,896 A | 7/1996 | Tambo et al. |
| 5,543,051 A | 8/1996 | Harris |
| 5,543,063 A | 8/1996 | Walker et al. |
| 5,578,202 A | 11/1996 | Hirane |
| 5,582,734 A | 12/1996 | Coleman et al. |
| 5,601,719 A | 2/1997 | Hawkins et al. |
| 5,611,927 A | 3/1997 | Schmid |
| 5,616,241 A | 4/1997 | Khudenko |
| 5,624,562 A | 4/1997 | Scroggins |
| 5,624,565 A | 4/1997 | Lefevre et al. |
| 5,626,755 A | 5/1997 | Keyser et al. |
| 5,635,062 A | 6/1997 | Cameron et al. |
| 5,647,982 A | 7/1997 | Haythornthwaite et al. |
| 5,650,069 A | 7/1997 | Hong et al. |
| 5,651,891 A | 7/1997 | Molof et al. |
| 5,658,458 A | 8/1997 | Keyser et al. |
| 5,667,680 A | 9/1997 | Haeffner |
| 5,685,983 A | 11/1997 | Frykhult |
| 5,725,772 A | 3/1998 | Shirodkar |
| 5,733,455 A | 3/1998 | Molof et al. |
| 5,733,456 A | 3/1998 | Okey et al. |
| 5,746,919 A | 5/1998 | Dague et al. |
| 5,750,041 A | 5/1998 | Hirane |
| 5,766,466 A | 6/1998 | Peterson |
| 5,773,526 A | 6/1998 | Van Dijk et al. |
| 5,783,081 A | 7/1998 | Gaddy |
| 5,792,352 A | 8/1998 | Scheucher et al. |
| 5,804,071 A | 9/1998 | Haeffner |
| 5,811,008 A | 9/1998 | Von Nordenskjold |
| 5,818,412 A | 10/1998 | Maekawa |
| 5,820,756 A | 10/1998 | McEwen et al. |
| 5,824,222 A | 10/1998 | Keyser et al. |
| 5,833,856 A | 11/1998 | Liu et al. |
| 5,846,424 A | 12/1998 | Khudenko |
| 5,853,588 A | 12/1998 | Molof et al. |
| 5,858,222 A | 1/1999 | Shibata et al. |
| 5,868,934 A | 2/1999 | Yamasaki et al. |
| 5,919,367 A | 7/1999 | Khudenko |
| 5,928,396 A | 7/1999 | Choi |
| 5,989,428 A | 11/1999 | Goronszy |
| 5,993,503 A | 11/1999 | Kruidhof |
| 6,004,463 A | 12/1999 | Swett |
| 6,015,496 A | 1/2000 | Khudenko |
| 6,036,862 A | 3/2000 | Stover |
| 6,039,874 A | 3/2000 | Teran et al. |
| 6,047,768 A | 4/2000 | Buehler, III |
| 6,054,044 A | 4/2000 | Hoffland et al. |
| 6,066,256 A | 5/2000 | Henry et al. |
| 6,077,430 A | 6/2000 | Chudoba et al. |
| 6,093,322 A | 7/2000 | Bongards |
| 6,110,389 A | 8/2000 | Horowitz |
| 6,113,788 A | 9/2000 | Molof et al. |
| 6,117,323 A | 9/2000 | Haggerty |
| 6,193,889 B1 | 2/2001 | Teran et al. |
| 6,217,768 B1 | 4/2001 | Hansen et al. |
| 6,231,761 B1 | 5/2001 | Mohlin et al. |
| 6,352,643 B1 | 3/2002 | Kwon et al. |
| 6,383,387 B2 | 5/2002 | Hasegawa et al. |
| 6,383,389 B1 | 5/2002 | Pilgram et al. |
| 6,416,668 B1 | 7/2002 | Al-Samadi |
| 6,423,229 B1 | 7/2002 | Mao |
| 6,447,617 B1 | 9/2002 | Bergmann |
| 6,454,949 B1 | 9/2002 | Sesay et al. |
| 6,527,956 B1 | 3/2003 | Lefevre et al. |
| 6,555,002 B2 | 4/2003 | Garcia et al. |
| 6,562,237 B1 | 5/2003 | Olaopa |
| 6,585,895 B2 | 7/2003 | Smith et al. |
| 6,592,762 B2 | 7/2003 | Smith |
| 6,605,220 B2 | 8/2003 | Garcia et al. |
| 6,613,238 B2 | 9/2003 | Schloss |
| 6,630,067 B2 | 10/2003 | Shieh et al. |
| 6,660,163 B2 | 12/2003 | Miklos |
| 6,666,965 B1 | 12/2003 | Timmons |
| 6,706,185 B2 | 3/2004 | Goel et al. |
| 6,712,970 B1 | 3/2004 | Trivedi |
| 6,783,679 B1 | 8/2004 | Rozich |
| 6,787,035 B2 | 9/2004 | Wang |
| D497,660 S | 10/2004 | Danielsson et al. |
| 6,805,806 B2 | 10/2004 | Arnaud |
| 6,814,868 B2 | 11/2004 | Phagoo et al. |
| 6,833,074 B2 | 12/2004 | Miklos |
| 6,852,225 B1 | 2/2005 | Oswald et al. |
| 6,863,818 B2 | 3/2005 | Daigger et al. |
| 6,884,355 B2 | 4/2005 | Kamiya et al. |
| 6,893,567 B1 | 5/2005 | Vanotti et al. |
| 7,105,091 B2 | 9/2006 | Miklos |
| 7,147,778 B1 | 12/2006 | DiMassimo et al. |
| 7,156,998 B2 | 1/2007 | Reid |
| 7,208,090 B2 | 4/2007 | Applegate et al. |
| 7,255,723 B2 | 8/2007 | Choi et al. |
| 7,258,791 B2 | 8/2007 | Matsumoto |
| 7,293,659 B2 | 11/2007 | Grace |
| 7,309,427 B2 | 12/2007 | Kruse et al. |
| 7,314,556 B2 | 1/2008 | Sheets et al. |
| 7,314,564 B2 | 1/2008 | Kruse et al. |
| 7,413,654 B2 | 8/2008 | Applegate et al. |
| 7,473,364 B2 | 1/2009 | Abu-Orf |
| 7,556,737 B2 | 7/2009 | Zhang |
| 7,569,147 B2 | 8/2009 | Curtis et al. |
| 7,597,805 B2 | 10/2009 | Danielsson et al. |
| 2001/0045390 A1 | 11/2001 | Kim et al. |
| 2002/0030003 A1 | 3/2002 | O'Leary et al. |
| 2002/0050283 A1 | 5/2002 | Bergmann |
| 2002/0185434 A1 | 12/2002 | Mao |
| 2002/0185435 A1 | 12/2002 | Husain et al. |
| 2002/0192809 A1 | 12/2002 | Lanting et al. |
| 2002/0195388 A1 | 12/2002 | Sierens et al. |
| 2004/0004038 A1 | 1/2004 | Yamaguchi et al. |
| 2004/0016698 A1 | 1/2004 | Unger |
| 2004/0206699 A1 | 10/2004 | Ho et al. |
| 2004/0232076 A1 | 11/2004 | Zha et al. |
| 2005/0035059 A1 | 2/2005 | Zhang et al. |
| 2005/0040103 A1 | 2/2005 | Abu-Orf et al. |
| 2005/0045557 A1 | 3/2005 | Daigger et al. |
| 2005/0061737 A1 | 3/2005 | Linden et al. |
| 2005/0194310 A1 | 9/2005 | Yamamoto et al. |
| 2006/0113243 A1 | 6/2006 | Applegate et al. |
| 2006/0124543 A1 | 6/2006 | Pehrson et al. |
| 2006/0249448 A1 | 11/2006 | Fujishima et al. |
| 2006/0249449 A1 | 11/2006 | Nakhla et al. |
| 2007/0000836 A1 | 1/2007 | Elefritz et al. |
| 2007/0045181 A1 | 3/2007 | Brase |
| 2007/0051677 A1 | 3/2007 | Curtis et al. |
| 2007/0193949 A1 | 8/2007 | You et al. |
| 2007/0235386 A1 | 10/2007 | Barnes |
| 2008/0041783 A1 | 2/2008 | Barnes |
| 2008/0223783 A1 | 9/2008 | Sutton |
| 2009/0014387 A1 | 1/2009 | Probst |
| 2009/0078646 A1 | 3/2009 | Curtis et al. |
| 2010/0015689 A1 | 1/2010 | Park et al. |
| 2011/0089105 A1 | 4/2011 | Liu et al. |
| 2011/0132836 A1 | 6/2011 | Olson |

FOREIGN PATENT DOCUMENTS

| | | |
|---|---|---|
| CN | 1884151 A | 12/2006 |
| CN | 1894167 A | 1/2007 |
| CN | 1914122 A | 2/2007 |
| CN | 100360439 C | 1/2008 |
| DE | 4217491 C1 | 2/1994 |
| DE | 4238708 A1 | 5/1994 |
| DE | 4444335 A1 | 6/1996 |
| EP | 0106043 A2 | 4/1984 |
| EP | 0408878 A1 | 1/1991 |
| EP | 0440996 A1 | 8/1991 |
| EP | 0497114 A1 | 8/1992 |
| EP | 0543457 | 5/1993 |
| EP | 1236686 A1 | 9/2002 |
| EP | 1596958 B1 | 11/2005 |

(56) References Cited

FOREIGN PATENT DOCUMENTS

| | | |
|---|---|---|
| FR | 2595957 A1 | 9/1987 |
| FR | 2674844 A1 | 10/1992 |
| FR | 2766813 B1 | 10/1999 |
| FR | 2843106 B1 | 10/2004 |
| GB | 957991 A | 5/1964 |
| GB | 1438697 A | 6/1976 |
| GB | 1441241 A | 6/1976 |
| GB | 2006743 A | 5/1979 |
| JP | 5687496 | 6/1981 |
| JP | 59032999 A | 2/1984 |
| JP | 59052597 A | 3/1984 |
| JP | 61192389 A | 8/1986 |
| JP | 62138986 A | 6/1987 |
| JP | 63130197 A | 6/1988 |
| JP | 63302996 A | 12/1988 |
| JP | 03-042019 A | 2/1991 |
| JP | 466195 | 3/1992 |
| JP | 60-84199 A | 3/1994 |
| JP | 6091285 A | 4/1994 |
| JP | 07-16589 | 1/1995 |
| JP | 2659167 B2 | 9/1997 |
| JP | 09262599 | 10/1997 |
| JP | 2000199086 A | 7/2000 |
| JP | 2000210542 A | 8/2000 |
| JP | 2001347296 A | 12/2001 |
| JP | 2002035779 A | 2/2002 |
| JP | 2002126800 A | 5/2002 |
| JP | 2003033780 A | 2/2003 |
| JP | 2006082024 A | 3/2006 |
| NL | 9301791 A | 5/1995 |
| NO | 3424055 A1 | 10/1994 |
| NO | 3735656 A1 | 10/1997 |
| NO | 3801397 A1 | 1/1998 |
| RU | 1596752 C | 9/1995 |
| WO | 9112067 A1 | 8/1991 |
| WO | 9315026 A1 | 8/1993 |
| WO | 03039712 A1 | 5/2003 |
| WO | 03041837 A1 | 5/2003 |
| WO | 03051487 A1 | 6/2003 |
| WO | 03072512 A1 | 9/2003 |
| WO | 2004076026 A1 | 9/2004 |
| WO | 2007104551 A1 | 9/2007 |
| WO | 2009086584 A1 | 7/2009 |
| WO | 2009120384 A2 | 10/2009 |

OTHER PUBLICATIONS

"Efficient treatment of high strength industrial and municipal wastewater" brochure by Envirex Inc., Jan. 1990.
"GAC Fluid Bed Efficient, economical bioremediation of BTEX groundwater," brochure by Envirex Inc., Dec. 1992.
"Internally-fed Rotary Wedgewire Screens" brochure by Parkson Corporation for Hycor® Rotoshear® (year not provided).
"Rex VLR/SCC System" brochure by Envirex Inc., Bulletin No. 315-156, Oct. 1989.
"The RotoscreenTM Escalating Fine Channel Screen Builds Pre-Coat to Provide High Solids Capture Rates with the Lowest Headloss," Jul. 29, 2005, p. 1 of 2—page screen, Parkson Corporation Web Home Page, http://www.parkson.com/Content.aspx?ntopicid=120&parent=process&processID=148.
"The Rotoshear® Internally Fed Rotating Drum Screen's Wedgewire Construction Maximizes Capture for Efficient Screening with Minimal Operator Attention," Jul. 29, 2005, p. 1 of 2—page screen, Parkson Corporation Web Home Page, http://www.parkson.com/Content.aspx?ntopicid=133&parent=municipal&processID=149.
"Vertical loop reactors—fine bubble power efficiency without fine bubble maintenance" brochure by Envirex Inc., Jan. 1986.
Abu-Orf et al., "Adjusting Floc cations to improve effluent quality: the case of aluminum addition at Sioux City Wastewater Treatment Facility," Water Environment Federation, 2004, 16 pages.

Abu-Orf et al., "Chemical and physical pretreatment of ATAD biosolids for dewatering," Water Science Technology, 2001, vol. 44, No. 10, pp. 309-314, IWA Publishing.
Bakker, Chapter IIA, "Cell K+ and K+ Transport Systems in Prokaryotes," In Alkali Cation Transport Systems in Prokaryotes, Bakker, E.P., 1993, pp. 205-224, CRC Press.
Bishop et al., "Fate of nutrients during aerobic digestion," Journal Environ. Eng. Div. Proc. Am. Soc. Civil Eng., 1978, vol. 104, No. EE5, pp. 967-979.
Bruus et al., "On the stability of activated sludge Flocs with implications to dewatering," Water Research, 1992, vol. 26, No. 12, pp. 1597-1604, Pergamon Press Ltd.
Caulet et al., "Modulated aeration management by combined ORP and DO control: a guarantee of quality and power savings for carbon and nitrogen removal in full scale wastewater treatment plants," Center of International Research for Water Environment, France, 1999.
Charpentier et al., "ORP Regulation and Activated Sludge, 15 years of Experience," 19th Biennial Conference/AWQ of Vancouver, Jun. 1998.
Chen et al., "Effect of sludge fasting/feasting on growth of activated sludge cultures," Wat. Res., 2001, vol. 35, No. 4, pp. 1029-1037, Elsevier Science Ltd., Pergamon.
Chen et al., "Minimization of activated sludge production by chemically stimulated energy spilling," Water Science and Technology, 2000, vol. 42, No. 12, pp. 189-200, IWA Publishing.
Chudoba et al., "Pre-denitrification performance of a high-loaded anoxic sludge," Degremont Research Center, France, 1999.
Chudoba et al., "The aspect of energetic uncoupling of microbial growth in the activated sludge process-OSA system," Water Science and Technology, 1992, vol. 26, No. 9-11, pp. 2477-2480, IAWPRC.
Dignac et al., "Chemical description of extracellular polymers: implication on activated sludge Floc structure," Water Science Technology, 1998, vol. 38, No. 8-9, pp. 45-53, Elsevier Science Ltd.
Dubois et al., "Colorimetric method for determination of sugars and related substances," Analytical Chemistry, 1956, vol. 28, No. 3, pp. 350-356.
Ekama et al., "Considerations in the process design of nutrient removal activated sludge processes," Water Science and Technology, 1983, vol. 15, pp. 283-318, IAWPRC/Pergamon Press Ltd.
Euro-Matic, "Hollow plastic balls for industrial applications," Sep. 10, 2004, 7 pages, http://www.euro-matic.com/hollow.html.
Frolund et al., "Extraction of extracellular polymers from activated sludge using a cation exchange resin," Water Research, 1996, vol. 30, No. 8, pp. 1749-1758, Elsevier Science Ltd.
Harrison et al., "Transient responses of facultatively anaerobic bacteria growing in chemostat culture to a change from anaerobic to aerobic conditions," Journal of General Microbiology, 1971, vol. 68, pp. 45-52.
Hartree, "Determination of protein: a modification of the Lowry Method that gives a linear photometric response," Analytical Biochemistry, 1972, vol. 48, pp. 422-427, Academic Press, Inc.
Higgins et al., "Characterization of exocellular protein and its role in bioflocculation," Journal of Environmental Engineering, 1997, vol. 123, pp. 479-485.
Higgins et al., "The effect of cations on the settling and dewatering of activated sludges: laboratory results," Water Environment Research, 1997, vol. 69, No. 2, pp. 215-224.
Holbrook et al., "A comparison of membrane bioreactor and conventional-activated-sludge mixed liquor and biosolids characteristics," Water Environment Research, 2005, vol. 77, No. 4, pp. 323-330.
Hong et al., "Biological phosphorus and nitrogen removal via the A/O process: recent experience in the United States and United Kingdom," Water Science and Technology, 1984, vol. 16, pp. 151-172, Vienna, Austria.
International Search Report dated Feb. 7, 2011 from PCT Application No. PCT/US10/58653.
Kakii et al., "Effect of calcium ion on sludge characteristics," J. Ferment. Technol., 1985, vol. 63, No. 3, pp. 263-270.

(56) References Cited

OTHER PUBLICATIONS

Kim et al., "pH and oxidation-reduction potential control strategy for optimization of nitrogen removal in an alternating aerobic-anoxic system," Water Environment Research, 2001, vol. 73, No. 1, pp. 95-102.

Klopping et al., "Activated sludge microbiology, filamentous and non-filamentous microbiological problems and biological nutrient removal," Water Environment Federation, Plant Operations Specialty Conference, 1999.

Low et al., "The use of chemical uncouplers for reducing biomass production during biodegradation," Water Science and Technology, 1998, vol. 37, No. 4-5, pp. 399-402, Elsevier Science Ltd./Pergamon.

Lowry et al., "Protein measurement with the folin phenol reagent," J. Bio. Chem., 1951, vol. 193, pp. 265-275.

Mahmoud et al., "Anaerobic stabilisation and conversion of biopolymers in primary sludge-effect of temperature and sludge retention time," Water Research, 2004, vol. 38, pp. 983-991, Elsevier Ltd.

Marais et al., "Observations supporting phosphate removal by biological excess uptake—a review," Water Science and Technology, 1983, vol. 15, pp. 15-41, IAWPRC/Pergamon Press Ltd.

Mavinic et al., "Fate of nitrogen in aerobic sludge digestion," J. Water Pollut. Control Fed., 1982, vol. 54, No. 4, pp. 352-360.

Moen et al., "Effect of solids retention time on the performance of thermophilic and vesophilic digestion of combined municipal wastewater sludges," Water Environment Research, 2003, vol. 75, No. 6, pp. 539-548.

Murthy et al., "Factors affecting Floc properties during aerobic digestion: implications for dewatering," Water Environment Research, 1999, vol. 71, No. 2, pp. 197-202.

Murthy et al., "Optimizing dewatering of biosolids from autothermal thermophilic aerobic digesters (ATAD) using inorganic conditioners," Water Environment Research, 2000, vol. 72, No. 6, pp. 714-721.

Ng et al., "Membrane bioreactor operation at short solids retention times: performance and biomass characteristics," Water Research, 2005, vol. 39, pp. 981-992.

Nielsen et al., "Changes in the composition of extracellular polymeric substances in activated sludge during anaerobic storage," Appl. Microbiol. Biotechnol., 1996, vol. 44, pp. 823-830, Springer-Verlag.

Notification of Transmittal of the International Search Report and the Written Opinion dated Dec. 21, 2011 for Application No. PCT/US11/47892.

Notification of Transmittal of the International Search Report and the Written Opinion dated Oct. 12, 2011 for Application No. PCT/US2011/026207.

Novak et al., "Mechanisms of Floc destruction during anaerobic and aerobic digestion and the effect on conditioning and dewatering of biosolids," Water Research, 2003, vol. 37, pp. 3136-3144, Elsevier Science Ltd.

Park et al., "The digestibility of waste activated sludges," Water Environment Research, 2006, vol. 78, No. 1, pp. 59-68.

Park et al., "The effect of wastewater cations on activated sludge characteristics: effects of aluminum and iron in Floc," Water Environment Research, 2006, vol. 78, No. 1, pp. 31-40.

Ra et al., "Biological nutrient removal with an internal organic carbon source in piggery wastewater treatment," Water Research, 2000, vol. 34, No. 3, pp. 965-973.

\* cited by examiner

ENHANCED BIOSORPTION OF WASTEWATER ORGANICS USING DISSOLVED AIR FLOTATION WITH SOLIDS RECYCLE

RELATED APPLICATIONS

This application claims priority under 35 U.S.C. §120 as a continuation of U.S. application Ser. No. 14/268,907 titled "ENHANCED BIOSORPTION OF WASTEWATER ORGANICS USING DISSOLVED AIR FLOTATION WITH SOLIDS RECYCLE," filed on May 2, 2014. U.S. application Ser. No. 14/268,907 claims priority under 35 U.S.C. §119(e) to U.S. Provisional Application Ser. No. 61/819,822 titled "ENHANCED BIOSORPTION OF WASTEWATER ORGANICS USING DISSOLVED AIR FLOTATION WITH SOLID RECYCLE," filed on May 6, 2013 and under 35 U.S.C. §120 as a continuation-in-part of U.S. application Ser. No. 13/210,487 titled "CONTACT-STABILIZATION/PRIME FLOAT HYBRID," filed on Aug. 16, 2011 and issued as U.S. Pat. No. 8,808,544 on Aug. 19, 2014, which claims priority under 35 U.S.C. §119(e) to U.S. Provisional Application Ser. No. 61/374,910 titled "STABILIZATION/PRIME FLOAT HYBRID (CAPTIVATOR)," filed on Aug. 18, 2010. Each of these applications is herein incorporated by reference in its entirety.

BACKGROUND

Aspects and embodiments of the present invention are directed toward systems and methods for the treatment of wastewater.

SUMMARY

In accordance with an embodiment of the present invention there is provided a method of facilitating increased operating efficiency of a wastewater treatment system. The method comprises configuring a dissolved air flotation (DAF) unit in a wastewater treatment system in fluid communication between a contact tank and a biological treatment unit to remove solids from a portion of a first mixed liquor output from the contact tank prior to the portion of the first mixed liquor entering the biological treatment unit and to recycle at least a portion of the solids to the contact tank, the recycle of the at least a portion of the solids to the contact tank reducing an amount of biological oxygen demand to be treated in the biological treatment unit as compared to the wastewater treatment system operating in the absence of recycling the at least a portion of the solids to the contact tank.

In some embodiments, greater than 50% of the solids are recycled from the DAF unit to the contact tank.

In some embodiments, the method comprises recycling solids from the DAF unit to the contact tank in an amount sufficient to increase biogas production of an anaerobic digester of the wastewater treatment system having an inlet in fluid communication with an outlet of the DAF unit, at least a second portion of the solids removed in the DAF unit being directed into the anaerobic digester.

In some embodiments, the method comprises recycling solids from the DAF unit to the contact tank in an amount sufficient to reduce the energy consumption of the wastewater treatment system.

In accordance with an embodiment of the present invention there is provided a wastewater treatment system. The wastewater treatment system comprises a contact tank having a first inlet, a second inlet, and an outlet and a dissolved air flotation tank having an inlet in fluid communication with the outlet of the contact tank, a first outlet, and a second outlet. The wastewater treatment system further comprises an aerated anoxic tank having a first inlet in fluid communication with the outlet of the contact tank, a second inlet, and an outlet and aerobic tank having a first inlet in fluid communication with the outlet of the aerated anoxic tank, a second inlet in fluid communication with the first outlet of the dissolved air flotation tank, and an outlet. The wastewater treatment system further comprises a clarifier having an inlet in fluid communication with the outlet of the aerobic tank and an outlet in fluid communication with the second inlet of the contact tank and with the second inlet of the aerated anoxic tank.

In accordance with another embodiment of the present invention there is provided a method of treating wastewater. The method comprises introducing the wastewater into a contact tank, mixing the wastewater with activated sludge in the contact tank to form a mixed liquor, transporting a first portion of the mixed liquor to a dissolved air flotation tank, separating the first portion of the mixed liquor in the dissolved air flotation tank to form a dissolved air flotation tank effluent and waste biosolids, transporting a second portion of the mixed liquor to an aerated anoxic treatment tank, biologically treating the second portion of the mixed liquor in the aerated anoxic treatment tank to form an anoxic mixed liquor, transporting the anoxic mixed liquor to an aerobic treatment tank, transporting the dissolved air flotation tank effluent to the aerobic treatment tank, biologically treating the anoxic mixed liquor and the dissolved air flotation tank effluent in the aerobic treatment tank to form an aerobic mixed liquor, transporting the aerobic mixed liquor to a clarifier, separating the aerobic mixed liquor in the clarifier to form a clarified effluent and a return activated sludge, recycling a first portion of the return activated sludge to the contact tank, and recycling a second portion of the return activated sludge to the aerated anoxic treatment tank.

In accordance with an embodiment of the present invention there is provided a wastewater treatment system. The wastewater treatment system comprises a contact tank having a first inlet configured to receive wastewater to be treated, a second inlet, and an outlet. The contact tank is configured to mix the wastewater to be treated with activated sludge to form a first mixed liquor. The system further comprises a DAF unit having an inlet in fluid communication with the outlet of the contact tank, a solids outlet, a DAF unit effluent outlet, and a gas inlet. The gas inlet is configured to introduce gas into the DAF unit to facilitate the flotation of suspended matter from the first mixed liquor and the removal of the suspended matter from the DAF unit. The solids outlet is in fluid communication with the first inlet of the contact tank and configured to transfer at least a portion of the suspended matter from the DAF unit to the first inlet of the contact tank. The system further comprises a biological treatment unit having a first inlet in fluid communication with the outlet of the contact tank, a second inlet, a third inlet in fluid communication with the DAF unit effluent outlet, and an outlet. The biological treatment unit is configured to biologically break down organic components of the first mixed liquor and of an effluent from the DAF unit to form a second mixed liquor. The system further comprises a clarifier having an inlet in fluid communication with the outlet of the biological treatment unit, an effluent outlet, and a return activated sludge outlet in fluid communication with the second inlet of the contact tank and with the second inlet of the biological treatment unit. The clarifier is configured to output a clarified effluent through the effluent outlet and a return activated sludge though the return activated sludge outlet.

In accordance with some aspects of the wastewater treatment system, the biological treatment unit includes an aerated anoxic region having a first inlet in fluid communication with the outlet of the contact tank, a second inlet, and an outlet and an aerobic region having a first inlet in fluid communication with the outlet of the aerated anoxic region, a second inlet in fluid communication with the DAF unit effluent outlet, and an outlet.

In accordance with some aspects of the wastewater treatment system, the aerated anoxic region and the aerobic region are included in a same treatment tank.

In accordance with some aspects of the wastewater treatment system, the aerated anoxic region and the aerobic region are separated by a partition.

In accordance with some aspects of the wastewater treatment system, the aerated anoxic region is included in a first treatment tank and the aerobic region is included in a second treatment tank distinct from the first treatment tank.

In accordance with some aspects of the wastewater treatment system, the wastewater treatment system comprises a first sub-system including the contact tank and the DAF unit which is physically separated from a second sub-system including the biological treatment unit and the clarifier.

In accordance with some aspects of the wastewater treatment system, the contact tank and the aerated anoxic region are included in a same tank.

In accordance with some aspects of the wastewater treatment system, the wastewater treatment system further comprises an anaerobic digester having an inlet in fluid communication with the solids outlet of the DAF unit and an outlet.

In accordance with some aspects of the wastewater treatment system, the outlet of the anaerobic digester is in fluid communication with at least one of the contact tank and the biological treatment unit.

In accordance with some aspects of the wastewater treatment system, the wastewater treatment system further comprises a primary clarifier having an inlet in fluid communication with a source of the wastewater to be treated and a solids-lean outlet in fluid communication with the contact tank.

In accordance with some aspects of the wastewater treatment system, the wastewater treatment system further comprises a thickener having an inlet in fluid communication with a solids-rich outlet of the primary clarifier and an outlet in fluid communication with the anaerobic digester.

In accordance with some aspects of the wastewater treatment system, the primary clarifier further comprises a solids-rich outlet in fluid communication with the DAF unit.

In accordance with another embodiment of the present invention there is provided a method of treating wastewater. The method comprises introducing the wastewater into a contact tank including an activated sludge, mixing the wastewater with activated sludge in the contact tank to form a mixed liquor, and directing a first portion of the mixed liquor to a DAF unit. The method further comprises separating the first portion of the mixed liquor in the DAF unit to form a DAF unit effluent and separated biosolids, directing at least a portion of the separated biosolids from the DAF unit to the contact tank, directing a second portion of the mixed liquor to a biological treatment unit, directing the DAF unit effluent to the biological treatment unit, biologically treating the mixed liquor and the DAF unit effluent in the biological treatment unit to form a biologically treated mixed liquor, and directing the biologically treated mixed liquor to a clarifier. The method further comprises separating the biologically treated mixed liquor in the clarifier to form a clarified effluent and a return activated sludge, recycling a first portion of the return activated sludge to the contact tank, recycling a second portion of the return activated sludge to the biological treatment unit, and directing the clarified effluent to a treated wastewater outlet.

In accordance with some aspects of the method of treating wastewater wherein the biological treatment unit includes an aerated anoxic treatment unit and an aerobic treatment unit, the method further comprises directing the second portion of the mixed liquor to the aerated anoxic treatment unit, treating the second portion of the mixed liquor in the aerated anoxic treatment unit to form an anoxic mixed liquor, directing the anoxic mixed liquor to the aerobic treatment unit, directing the DAF unit effluent to the aerobic treatment unit, treating the anoxic mixed liquor and the DAF unit effluent in the aerobic treatment tank to form an aerobic mixed liquor, directing the aerobic mixed liquor to the clarifier, separating the aerobic mixed liquor in the clarifier to form the clarified effluent and the return activated sludge, and recycling the second portion of the return activated sludge to the aerated anoxic treatment unit.

In accordance with some aspects of the method of treating wastewater, the first portion of the return activated sludge and the second portion of the return activated sludge comprise about 100% of all return activated sludge formed in the clarifier.

In accordance with some aspects of the method of treating wastewater, the first portion of the return activated sludge comprises between about 10% and about 20% of all return activated sludge recycled from the clarifier.

In accordance with some aspects of the method of treating wastewater, the first portion of the mixed liquor comprises between about one third and about two thirds of all mixed liquor formed in the contact tank.

In accordance with some aspects of the method of treating wastewater, the DAF unit removes between about 60% and about 100% of suspended solids in the first portion of the mixed liquor from the first portion of the mixed liquor.

In accordance with some aspects of the method of treating wastewater, an amount of suspended solids removed in the DAF unit is adjusted based upon a concentration of a bacteria in the biological treatment unit.

In accordance with some aspects of the method of treating wastewater, the DAF unit removes between about 40% and about 80% of biological oxygen demand in the first portion of the mixed liquor from the first portion of the mixed liquor.

In accordance with some aspects of the method of treating wastewater, the method further comprises treating at least a portion of the waste biosolids in an anaerobic digester to produce an anaerobically digested sludge.

In accordance with some aspects of the method of treating wastewater, the method further comprises recycling at least a portion of the anaerobically digested sludge to at least one of the contact tank and the biological treatment unit.

In accordance with some aspects of the method of treating wastewater, the method further comprises separating the water to be treated into a solids-lean portion and a solids-rich portion, directing the solids-rich portion into a thickener to produce a solids-rich output and a solids-lean effluent, directing the solids-lean portion into the contact tank, directing the solids-rich output from the thickener into the anaerobic digester, and directing the solids-lean effluent of the thickener into the contact tank.

In accordance with another embodiment of the present invention there is provided method of facilitating increased operating efficiency of a wastewater treatment system. The method comprises providing a DAF unit in a wastewater treatment system in fluid communication between a contact tank and a biological treatment unit, the DAF unit configured to remove solids from a portion of a first mixed liquor output from the contact tank prior to the portion of the first mixed liquor entering the biological treatment unit and to recycle at least a portion of the solids to the contact tank, reducing the amount of biological oxygen demand to be treated in the biological treatment unit as compared to the wastewater treatment system operating in the absence of the DAF unit, and providing for a solids-liquid separation unit in fluid communication downstream of the biological treatment unit to recycle a return activated sludge formed from a mixed liquor output from the biological treatment unit to the contact tank.

In accordance with some aspects, the method further comprises providing for between about 10% and about 20% of the return activated sludge formed to be recycled to the contact tank.

In accordance with some aspects, the method further comprises adjusting an amount of return activated sludge recycled to the contact tank based upon a concentration of a bacteria in the biological treatment unit.

In accordance with some aspects, the method further comprises providing an anaerobic digester having an inlet in fluid communication with an outlet of the DAF unit and an outlet in fluid communication with at least one of an inlet of the contact tank and an inlet of the biological treatment unit.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
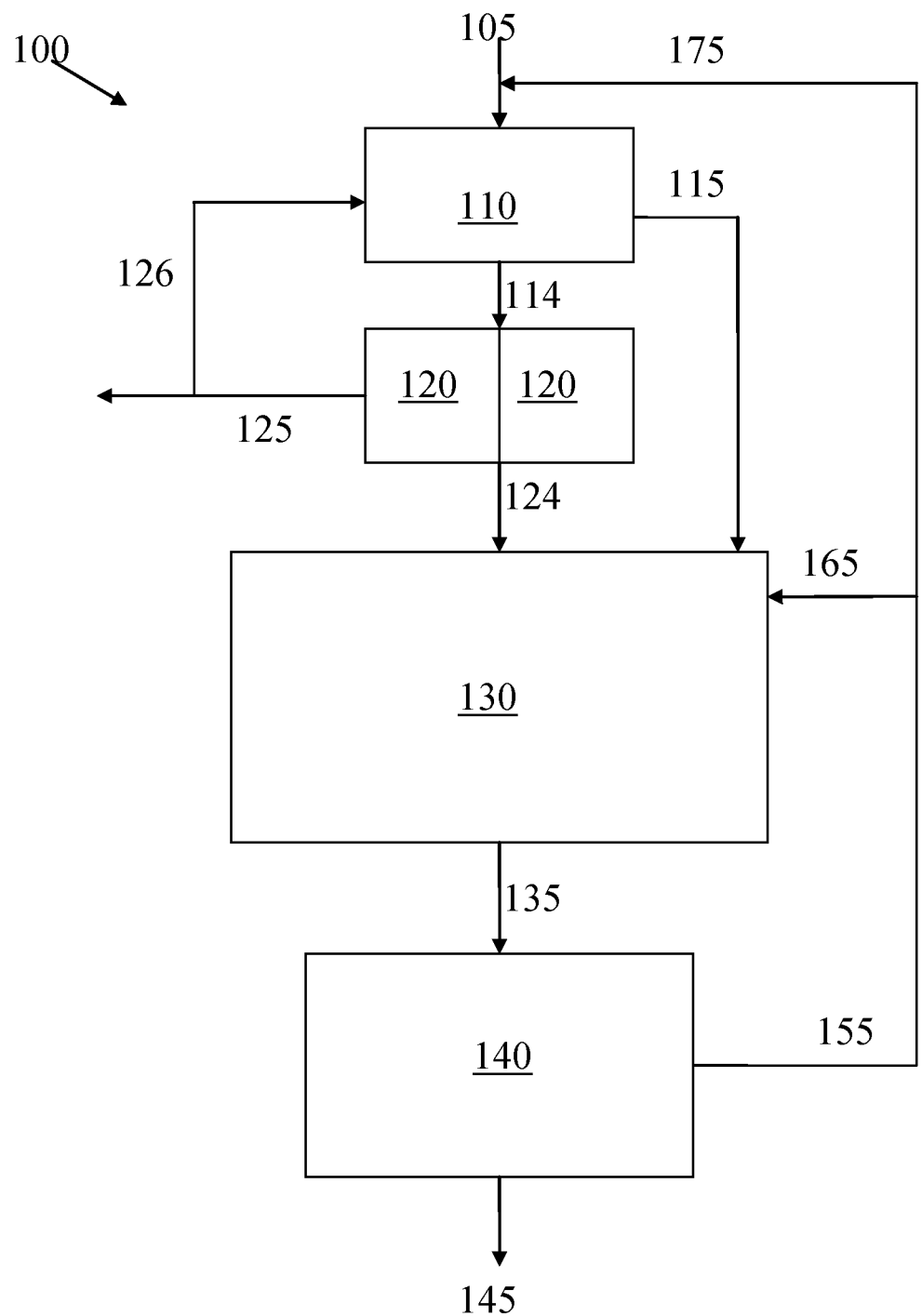
FIG. 1 is a block flow diagram of a wastewater treatment system in accordance with an embodiment of the present invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

As the term is used herein, an "upstream" unit operation refers to a first unit operation which is performed upon a fluid undergoing treatment prior to a second unit operation. Similarly, an "upstream" treatment vessel or portion thereof refers to a first treatment vessel or portion thereof in which a first unit operation is performed prior to a second unit operation performed in a second treatment vessel or portion thereof. A "downstream" unit operation refers to a second unit operation which is performed upon a fluid undergoing treatment subsequent to a first unit operation. Similarly, a "downstream" treatment vessel or portion thereof refers to a second treatment vessel or portion thereof in which a second unit operation is performed subsequent to a first unit operation performed in a first treatment vessel or portion thereof. An upstream unit operation and/or treatment vessel having an outlet in "direct fluid communication" with an inlet of a downstream unit operation and/or treatment vessel directs material output from the outlet of the upstream unit operation and/or treatment vessel into the inlet of the downstream unit operation and/or treatment vessel without any intervening operations performed on the material. A first unit operation and/or treatment vessel described herein as being in fluid communication with a second unit operation and/or treatment vessel should be understood as being in direct fluid communication with the second unit operation and/or treatment vessel unless explicitly described as otherwise. Conduits which provide fluid communication between a first and a second unit operation and/or treatment vessel are to be understood as providing direct fluid communication between the first and second unit operation and/or treatment vessel unless explicitly described as otherwise.

Various unit operations and/or treatment vessels disclosed herein separate fluid and/or sludge into a solids-rich portion and a solids-lean portion wherein the solid-lean potion has a lower concentration of solids than the solids-rich portion. As the term is used herein, an "effluent" of a unit operation and/or treatment vessel refers to the solids-lean portion of the separated fluid and/or sludge. "Recycle" of material refers to directing material from an outlet of a downstream unit operation and/or treatment vessel to an inlet of a unit operation and/or treatment vessel upstream of the downstream unit operation and/or treatment vessel.

Co-pending U.S. application Ser. No. 13/210,487, titled "Contact Stabilization/Prime Float Hybrid" is incorporated herein by reference in its entirety for all purposes.

Aspects and embodiments of the present invention are directed toward systems and methods for treating wastewater. As used herein the term "wastewater" includes, for example, municipal wastewater, industrial wastewater, agricultural wastewater, and any other form of liquid to be treated containing undesired contaminants. Aspects and embodiments of the present invention may be utilized for primary wastewater treatment, secondary wastewater treatment, or both. Aspects and embodiments of the present invention may remove sufficient contaminants from wastewater to produce product water that may be used for, for example, irrigation water, potable water, cooling water, boiler tank water, or for other purposes.

In some embodiments, the apparatus and methods disclosed herein provide advantages with regard to, for example, capital costs, operational costs, and environmental-friendliness as compared to conventional biological wastewater treatment systems. In some embodiments a dissolved air flotation system is included in a main stream of wastewater entering a biological wastewater treatment system. The dissolved air floatation system may remove a significant amount of biological oxygen demand, for example, particulate biological oxygen demand, from wastewater prior to the wastewater entering the biological treatment portion of the wastewater treatment system. This provides for a reduction in the size of the biological treatment portion of the wastewater treatment system for a given wastewater stream as compared to a conventional wastewater treatment system and a commensurate reduced capital cost for the overall system. Utilization of the dissolved air flotation system also reduces the requirement for aeration in the biological treatment portion of the treatment system to effect oxidation of the biological oxygen demand of the wastewater, reducing operating costs. The amount of waste sludge generated by the biological treatment portion of the treatment system is also reduced, reducing the amount of waste which would need to be disposed of or otherwise further treated. The material removed from the wastewater in the dissolved air flotation system may be utilized to produce energy, for example, in the form of biogas in a downstream anaerobic digestion system. The biogas may be used to provide salable energy through combustion or through use in, for example, fuel cells.

A first embodiment, indicated generally at 100, is illustrated in FIG. 1. Wastewater from a source of wastewater 105 is directed into a contact tank 100 through an inlet of the contact tank. In the contact tank 110, the wastewater is mixed with activated sludge recycled through a conduit 175 from a downstream biological treatment process described below. In some embodiments, the contact tank 110 is aerated to facilitate mixing of the wastewater and the activated sludge. The aeration gas may be an oxygen containing gas, for example, air. The contact tank 100 may be provided with sufficient oxygen such that aerobic conditions are maintained in at least a portion of the contact tank 110. For example, the contact tank 110 may be aerated. Suspended and dissolved solids in the wastewater, including oxidizable biological materials (referred to herein as Biological Oxygen Demand, or BOD), are absorbed into the activated sludge in the contact tank, forming a first mixed liquor. A portion of the BOD may also be oxidized in the contact tank 110. The residence time of the wastewater in the contact tank may be sufficient for the majority of the BOD to be absorbed by the activated sludge, but no so long as for a significant amount of oxidation of the BOD to occur. In some embodiments, for example, less than about 10% of the BOD entering the contact tank 110 is oxidized in the contact tank. The residence time of the wastewater in the contact tank is in some embodiments from about 30 minutes to about two hours, and in some embodiments, from about 45 minutes to about one hour. The residence time may be adjusted depending upon factors such as the BOD of the influent wastewater. A wastewater with a higher BOD may require longer treatment in the contact tank 110 than wastewater with a lower BOD.

A first portion of the first mixed liquor formed in the contact tank is directed into a dissolved air flotation (DAF) system 120 through conduit 114. The DAF system may include a vessel, tank, or other open or closed containment unit configured to perform a dissolved air flotation operation as described below. For the sake of simplicity a dissolved air flotation system will be referred to herein as a "DAF unit." The DAF unit 120 may function as both a thickener and a clarifier. FIG. 1 illustrates two DAF units 120 operating in parallel, however, other embodiments may have a single DAF unit or more than two DAF units. Providing multiple DAF units provides for the system to continue operation if one of the DAF units is taken out of service for cleaning or maintenance.

Before entering the DAF unit(s), air or another gas may be dissolved in the first mixed liquor under pressure. The pressure may be released as the first mixed liquor enters the DAF unit(s) 120, resulting in the gas coming out of solution and creating bubbles in the mixed liquor. In some embodiments, instead of dissolving gas into the first mixed liquor, a fluid, for example, water having a gas, for example, air, dissolved therein, is introduced into the DAF unit(s) 120 with the first mixed liquor. Upon the mixing of the first mixed liquor and the gas-containing fluid, bubbles are produced. The bubbles formed in the DAF unit(s) 120 adhere to suspended matter in the first mixed liquor, causing the suspended matter to float to the surface of the liquid in the DAF unit(s) 120, where it may be removed by, for example, a skimmer.

In some embodiments, the first mixed liquor is dosed with a coagulant, for example, ferric chloride or aluminum sulfate prior to or after introduction into the DAF unit(s) 120. The coagulant facilitates flocculation of suspended matter in the first mixed liquor.

In the DAF unit(s) 120 at least a portion of the solids present in the influent first mixed liquor, including solids from the influent wastewater and from the recycled activated sludge, are removed by a dissolved air flotation process. At least a portion of any oil that may be present in the first mixed liquor may also be removed in the DAF unit(s) 120. In some embodiments, a majority, for example, about 60% or more, about 75% or more, or about 90% or more of the suspended solids in the first mixed liquor introduced into the DAF unit(s) 120 is removed and about 40% or more, for example, about 50% or more or about 75% or more of the BOD is removed. Removal of the BOD may include enmeshment and adsorption in the first mixed liquor and/or oxidation of the BOD and the formation of reaction products such as carbon dioxide and water. In other embodiments, up to about 100% of the suspended solids is removed in the DAF unit(s) 120 and a majority, for example, up to about 80% of the BOD is removed.

In some embodiments, suspended solids removed in the DAF unit(s) 120 are sent out of the system as waste solids through a conduit 125. These waste solids may be disposed of, or in some embodiments, may be treated in a downstream process, for example, an anaerobic digestion process or anaerobic membrane bioreactor to produce useful products, for example, biogas and/or usable product water.

In other embodiments, at least a portion of the suspended solids removed in the DAF unit(s) 120 are recycled back to the contact tank 110 through conduits 125 and 126. Conduit 126 may branch off of conduit 125 as illustrated, or may be connected to a third outlet of the DAF unit(s) 120, in which case suspended solids removed in the DAF unit(s) 120 are recycled back to the contact tank 110 through conduit 126 only. The amount of solids recycled from DAF unit(s) 120 to the contact tank 110 may range from about 1% to about 100% of a total amount of solids removed from the first mixed liquor in the DAF unit(s) 120. The amount of solids recycled from DAF unit(s) 120 to the contact tank 110 may be a majority of a total amount of solids removed from the first mixed liquor in the DAF unit(s) 120, for example, greater than about 50%, between about 50% and about 95%, or between about 60% and about 80% of the total amount of solids removed from the first mixed liquor in the DAF unit(s) 120.

Recycling solids removed in the DAF unit(s) 120 to the contact tank 110 is counter to the conventional operation of wastewater treatment systems including DAF units. Typically, DAF units are utilized in wastewater treatment systems to remove solids from the wastewater, thus reducing the need for biological treatment of these removed solids and reducing the energy requirements of the wastewater treatment system by, for example, reducing the amount of air needed to be supplied to an aerated biological treatment vessel to oxidize the removed solids. It is counter to conventional operation of wastewater treatment systems to re-introduce floated solids separated from mixed liquor from a contact tank in DAF unit(s) back to the contact tank. Typically, after solids are separated from mixed liquor from a contact tank in DAF unit(s), reintroducing the separated solids into mixed liquor in the contact tank and force the solids to go through the same separation process in the DAF unit(s) again reducing the efficiency of the system. Such a solids recycle from DAF unit(s) to a contact tank directly upstream of the DAF unit(s) would cause a need for a greater amount of contact tank capacity and a greater amount of DAF unit capacity. Such a solids recycle from DAF unit(s) to a contact tank directly upstream of the DAF unit(s) would also require more air flow to the DAF unit(s) to remove the recycled solids from the mixed liquor in addition to any solids that would be present in the absence of the solids recycle. It has been discovered, however, that benefits may be achieved by the counterintuitive re-introduction of solids removed in DAF unit(s) back into the contact tank of a wastewater treatment system from which mixed liquor is supplied to the DAF unit(s).

For example, by recycling the solids removed by the DAF unit(s) 120 to the contact tank 110, the amount of total suspended solids (TSS) in the contact tank 110 may be increased as compared to methods not including a recycle of solids from the DAF unit(s) 120 to the contact tank 110. The increased TSS level in the contact tank 110 may provide for additional soluble BOD to be adsorbed in the contact tank 110 as compared to a contact tank 110 having a lower level of TSS. In some embodiments, a desirable TSS level in the contact tank 110 may be between about 1,200 mg/L and about 3,500 mg/L.

The removal of the additional soluble BOD in the contact tank 110 due to the higher TSS level in the contact tank 110, resulting from the recycle of solids from the DAF unit(s) 120 to the contact tank 110, provides for the removal of this additional BOD as solids in the DAF unit(s) 120. The additional BOD removed as solids in the DAF unit(s) 120 may be directed to an anaerobic digester (for example, anaerobic digester 490 illustrated in FIG. 4) rather than an aerated biological treatment unit (for example, biological treatment unit 130), thus reducing the need for aeration power in the biological treatment unit and increasing the amount of biogas that could be produced in the anaerobic digester.

When supplied with recycled solids from the DAF unit(s) 120, the contact tank 110 may have a hydraulic retention time (HRT) of between about 15 minutes and about one hour and a solids retention time (SRT) of between about 0.5 days and about two days to effectively adsorb soluble BOD. In other embodiments, the SRT in the contact tank may be between about 0.2 and about 0.4 days. When the contact tank 110 includes TSS in a range of between about 1,200 mg/L and about 3,500 mg/L, a sludge age (SRT) in the contact tank may range from about one to about two days.

Recycling solids removed in the DAF unit(s) 120 to the contact tank 110 provides for the contact tank 110 to function as a high rate activated sludge system while the DAF unit(s) 120 function a solids-liquid separator. Recycling solids removed in the DAF unit(s) 120 to the contact tank 110 provides for greater oxidation of BOD in the contact tank 110 than in systems where solids removed from the DAF unit(s) 120 are not recycled to the contact tank because the solids recycled to the contact tank includes living bacteria capable of oxidizing BOD. For example, in systems and methods where solids removed in the DAF unit(s) 120 are recycled to the contact tank 110, oxidation of greater than about 10% of the BOD in wastewater influent to the contact tank 110 may be oxidized in the contact tank 110. Recycling solids removed in the DAF unit(s) 120 to the contact tank 110 may thus reduce the amount of BOD that needs to be treated in downstream unit operations, for example, in the biological treatment unit 130 discussed below, thus reducing the power requirements for the downstream unit operations. The SRT of the contact tank 110 may be adjusted to optimize BOD removal of particulate, colloidal, and soluble BOD fractions.

Effluent from the DAF unit(s) 120 is directed through conduit 124 into the biological treatment unit 130, which may include one or more treatment tanks. In some embodiments, the biological treatment unit 130 may comprise a contact stabilization vessel. A portion of the effluent may be recycled (recycle system not shown in FIG. 1) to supply gas bubbles to the DAF unit(s) 120. A gas may be dissolved into the recycled portion of effluent, which is then directed back into the DAF unit(s) 120 and mixed with influent first mixed liquor.

A second portion of the first mixed liquor formed in the contact tank is directed into the biological treatment unit 130 through a conduit 115. In some embodiments, about a half of the first mixed liquor formed in the contact tank is directed into the DAF unit(s) 120 and about a half of the first mixed liquor formed in the contact tank is directed through the conduit 115 into the biological treatment unit 130. In other embodiments, between about one third and two thirds of the first mixed liquor formed in the contact tank is directed into the DAF unit(s) 120 and the remainder of the first mixed liquor formed in the contact tank is directed through the conduit 115 into the biological treatment unit 130. The amount of the first mixed liquor directed into the DAF unit(s) 120 as opposed to the biological treatment unit 130 may be varied based upon such factors as the concentration of the first mixed liquor and the effectiveness of the first mixed liquor at enmeshing BOD in the contact tank 110.

For example, if it was desired to remove a greater rather than a lesser amount of solids in the DAF unit(s) 120, a greater fraction of the first mixed liquor from the contact tank would be directed to the DAF unit(s) 120 when the first mixed liquor had a lower rather than a higher concentration of solids. Similarly, if it was desired to remove a greater rather than a lesser amount of BOD in the DAF unit(s) 120, a greater fraction of the first mixed liquor from the contact tank would be directed to the DAF unit(s) 120 when the first mixed liquor had a lesser rather than a greater effectiveness at enmeshing BOD in the contact tank.

In the biological treatment unit 130, the effluent from the DAF unit(s) 120 and the first mixed liquor formed in the contact tank 110 are combined to form a second mixed liquor which is biologically treated. In some embodiments, biological treatment of the second mixed liquor in the biological treatment unit 130 includes oxidation of BOD in the second mixed liquor. To this end, oxygen may be supplied to the second mixed liquor in the biological treatment unit 130 by aeration with an oxygen containing gas, for example, air. In some embodiments, the biological treatment unit 130 is supplied with sufficient oxygen for aerobic conditions to be created in the biological treatment unit 130. In other embodiments, the amount of oxygen supplied is insufficient to meet the entire oxygen demand of the second mixed liquor, and the biological treatment unit 130, or at least a portion thereof, may be maintained in an anoxic or anaerobic condition. Nitrification and denitrification of the second mixed liquor may occur in different portions of the aerated biological treatment unit 130. The residence time of the second mixed liquor in the biological treatment unit 130 may be sufficient to oxidize substantially all BOD in the second mixed liquor. Residence time for the second mixed liquid in the biological treatment unit 130 may be from about three to about eight hours. This residence time may be increased if the influent wastewater to be treated and/or the second mixed liquor contains a high level of BOD or decreased if the influent wastewater to be treated and/or the second mixed liquor includes a low level of BOD.

Biologically treated mixed liquor from the biological treatment unit 130 is directed through a conduit 135 into a separation apparatus, which may include, for example, a clarifier 140, a gravity separation apparatus, and/or another form of separation apparatus. Effluent from the clarifier 140 may be directed to a product water outlet through a conduit 145 or be sent on for further treatment. Activated sludge separated from effluent in the clarifier may be recycled back upstream to a wastewater inlet of the system, the source of wastewater, the contact tank 110 through conduits 155 and 175, and/or the biological treatment unit 130 through conduits 155 and 165. In some embodiments 100% of the activated sludge separated in the clarifier is recycled upstream. In some embodiments between about 10% and about 20% of the recycled sludge is directed to the wastewater inlet and contact tank through the conduit 175 and between about 80% and 90% of the recycled sludge is directed into the biological treatment unit 130 through the conduit 165. The amount of recycled sludge directed to the wastewater inlet and contact tank through the conduit 175 may be set at a higher end of this range when the incoming wastewater has a high level of BOD and/or when the recycled sludge is less rather than more effective at enmeshing BOD in the contact tank 110. The amount of recycled sludge directed to the wastewater inlet and contact tank through the conduit 175 may be set at a lower end of this range when the incoming wastewater has a low level of BOD and/or when the recycled sludge is more rather than less effective at enmeshing BOD in the contact tank 110.

The amount of activated sludge separated in the clarifier 140 which is recycled to the contact tank 110 and/or biological treatment unit 130 may also be adjusted based on a fraction of the first mixed liquor from the contact tank 110 which is directed to the DAF unit(s) 120, the amount of activated sludge which is removed in the DAF units(s) 120, and/or the amount of activated sludge removed in the DAF units(s) 120 which is recycled to the contact tank 110. The amount of activated sludge which is recycled to the contact tank 110 and/or biological treatment unit 130 may be an amount equal to or greater than an amount required to maintain a desired population of bacteria in the biological treatment unit 130 to perform biological treatment of the second mixed liquor within a desired timeframe and/or to protect against depletion of the bacterial population in the event of temporary disruptions in the operation of the treatment system. For example, the amounts of activated sludge which is recycled to the contact tank 110 or biological treatment unit 130 may be set such that sufficient bacteria containing solids are present in the biological treatment unit 130 to result in a SRT of between about one and about 10 days in the biological treatment unit 130. Similarly, an amount or fraction of the first mixed liquor directed into the DAF unit(s) 120 may be adjusted based on the amount of activated sludge recycled from the clarifier 140, the efficiency of removal of solids in the DAF unit(s) 120 and/or the concentration of one or more types of bacteria in the biological treatment unit 130 to, for example, establish or maintain a desired population of bacteria in the biological treatment unit 130.

In the embodiment illustrated in FIG. 1, and in the additional embodiments described below, it should be understood that the various conduits illustrated may be provided with, for example, pumps, valves, sensors, and control systems as needed to control the flow of fluids therethrough. These control elements are not illustrated in the figures for the sake of simplicity.

Figure 2:
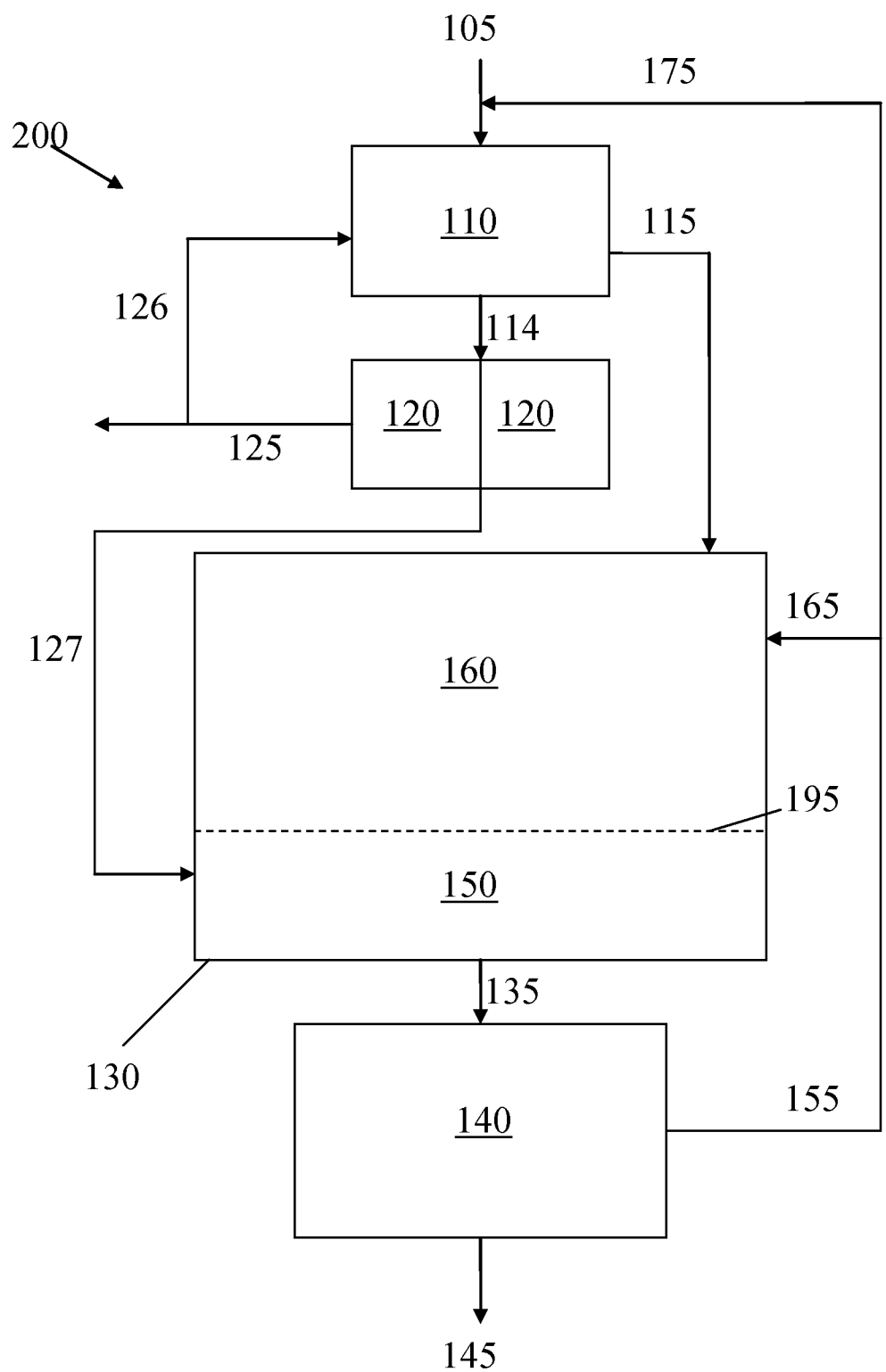
FIG. 2 is a block flow diagram of a wastewater treatment system in accordance with another embodiment of the present invention.

In another embodiment, indicated generally at 200 in FIG. 2, the biological treatment unit 130 includes an aerobic region 150 and an aerated anoxic region 160. The aerobic region 150 is in fluid communication downstream of the aerated anoxic region 160 and receives biologically treated anoxic mixed liquor from the aerated anoxic region. In some embodiments, the aerobic region 150 may be formed in a same vessel or tank as the aerated anoxic region 160 and separated therefrom by a partition or weir 195. In other embodiments, the aerobic region 150 may be physically separate from the aerated anoxic region 160. For example, the aerobic region 150 and the aerated anoxic region 160 may occupy distinct vessels or tanks or may be otherwise separated from one another. In further embodiments the contact tank 110 may be combined with the aerated anoxic region 160 in the same tank.

In the system of FIG. 2 effluent from the DAF unit(s) 120 is directed into the aerobic region 150 without first passing through the aerated anoxic region 160. In other embodiments, the effluent from the DAF unit(s) 120 may be introduced into the aerated anoxic region 160 and then directed into the aerobic region 150.

Figure 3:
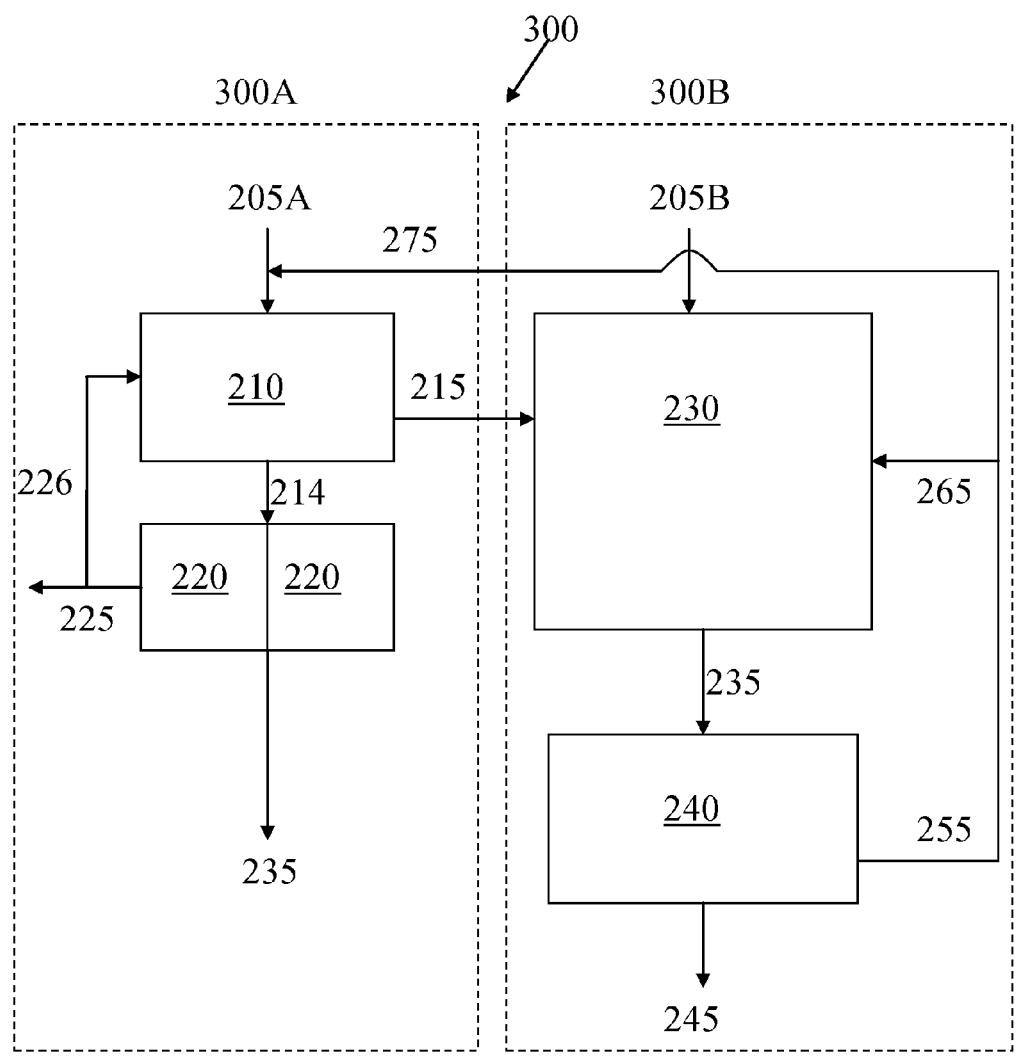
FIG. 3 is a block flow diagram of a wastewater treatment system in accordance with another embodiment of the present invention.

Another embodiment, indicated generally at 300, is illustrated in FIG. 3. In this embodiment, the wastewater treatment system 300 is broken into two separate but interconnected subsystems, one subsystem 300A including a contact tank 210 and DAF unit(s) 220, and a second subsystem 300B including a biological treatment unit 230 and a separation apparatus 240. In the first subsystem 300A influent wastewater from a source of wastewater 205A is directed into the contact tank 210. In the contact tank, the wastewater is mixed with activated sludge recycled through a conduit 275 from a biological treatment process included in subsystem 300B described below. In some embodiments, the contact tank 210 is aerated to facilitate mixing of the wastewater and the activated sludge. Suspended and dissolved solids in the wastewater are adsorbed/absorbed into the activated sludge in the contact tank 210, forming a first mixed liquor. A portion of the BOD in the influent wastewater may be oxidized in the contact tank 210. The residence time of the wastewater in the contact tank may be sufficient for the majority of the BOD to be adsorbed/absorbed by the activated sludge, but no so long as for a significant amount of oxidation of the BOD to occur. In some embodiments, for example, less than about 10% of the BOD entering the contact tank 210 is oxidized in the contact tank. The residence time of the wastewater in the contact tank is in some embodiments from about 30 minutes to about two hours, and in some embodiments, from about 45 minutes to about one hour. The residence time may be adjusted depending upon factors such as the BOD of the influent wastewater. A wastewater with a higher BOD may require longer treatment in the contact tank 210 than wastewater with a lower BOD.

A first portion of the first mixed liquor formed in the contact tank is directed into a DAF unit 220 through conduit 214. FIG. 3 illustrated two DAF units 220 operating in parallel, however other embodiments may have a single DAF unit or more than two DAF units. Providing multiple DAF units provides for the system to continue operation if one of the DAF units is taken out of service for cleaning or maintenance. A second portion of the first mixed liquor formed in the contact tank is directed into the biological treatment unit 230 in the second subsystem 300B through a conduit 215. In some embodiments, about a half of the first mixed liquor formed in the contact tank is directed into the DAF unit(s) 220 and about a half of the first mixed liquor formed in the contact tank is directed through the conduit 215 into the biological treatment unit 230. In other embodiments, between about one third and two thirds of the first mixed liquor formed in the contact tank is directed into the DAF unit(s) 220 and the remainder of the first mixed liquor formed in the contact tank is directed through the conduit 215 into the biological treatment unit 230. The amount of the first mixed liquor directed into the DAF unit(s) 220 as opposed to the biological treatment unit 230 may be varied based upon such factors as the concentration of the first mixed liquor and the effectiveness of the first mixed liquor at enmeshing BOD in the contact tank 210.

In the DAF unit(s) 220 at least a portion of the solids present in the influent first mixed liquor, including solids from the influent wastewater and from the recycled activated sludge, are removed by a dissolved air flotation process such as that described above with reference to DAF unit(s) 120. The removed suspended solids may be sent out of the system as waste solids through a waste conduit 225. These waste solids may be disposed of or treated in a downstream process, for example, an anaerobic digestion process or anaerobic membrane bioreactor to produce biogas and/or usable product water. Effluent from the DAF unit(s) 220 is directed to an outlet 235 from which it may be used as product water or sent on for further treatment.

In some embodiments, a portion of the suspended solids removed from the first mixed liquor in the DAF unit(s) 220 may be recycled to the contact tank 210 through conduits 225 and 226 in a similar manner as the recycle of suspended solids removed in the DAF unit(s) 120 to the contact tank 110 described above with reference to FIG. 1.

In the second subsystem 300B, influent wastewater from a source of wastewater 205B is introduced into the biological treatment unit 230. The source of wastewater 205B may be the same as or different from the source of wastewater 205A. In the biological treatment unit 230 the wastewater and the first mixed liquor formed in the contact tank 210 are combined to form a second mixed liquor which is biologically treated. In some embodiments, biological treatment of the second mixed liquor in the biological treatment unit 230 may include oxidation of BOD in the second mixed liquor. To this end, oxygen may be supplied to the second mixed liquor in the biological treatment unit 230 by aeration with an oxygen containing gas, for example, air. In some embodiments, the biological treatment unit 230 is supplied with sufficient oxygen for aerobic conditions to be created in the biological treatment unit 230. In other embodiments, the amount of oxygen supplied is insufficient to meet the entire oxygen demand of the second mixed liquor and the biological treatment unit 230, or at least a portion thereof, may be maintained in an anoxic or anaerobic condition. Nitrification and denitrification of the second mixed liquor may occur in different portions of the aerated biological treatment unit 230.

Residence time for the second mixed liquid in the biological treatment tank 230 may be from about three to about eight hours. This residence time may be increased if the influent wastewater to be treated and/or the second mixed liquor contains a high level of BOD or decreased if the wastewater and/or the second mixed liquor includes a low level of BOD.

Biologically treated mixed liquor from the biological treatment unit 230 is directed through a conduit 235 into a separation apparatus, which may include, for example, a clarifier 240. Effluent from the clarifies 240 may be directed to a product water outlet through a conduit 245 or be sent on for further treatment. Activated sludge separated from effluent in the clarifier may be recycled back upstream to the biological treatment unit 230 and/or to the contact tank 210 in subsystem 300A through a conduit 255. In some embodiments about 100% of the activated sludge separated in the clarifier is recycled upstream. In some embodiments from about 10% to about 20% of the recycled sludge is directed to the wastewater inlet and contact tank through a conduit 275 and from about 80% to about 90% of the recycled sludge is directed into the biological treatment unit 230 through a conduit 265.

Utilizing DAF units as described above in a wastewater treatment system provides several advantages over similar wastewater treatment systems operated without DAF units. Because the DAF units remove a significant portion of suspended solids from influent wastewater without the need for oxidation of these solids, the size of other components of the system may be reduced, resulting in a lower capital cost for the system. For example, primary clarifiers may be omitted from the wastewater treatment system. Due to the reduced amount of oxidized solids to be removed from the system, a final clarifier, such as the clarifier 140, may be reduced in size, in some embodiments by about 50%. Because a lower amount of BOD enters the biological treatment unit (for example, the biological treatment unit 130), the size of the biological treatment unit may be reduced, in some embodiments by about 30%. There is also a lesser requirement for oxygen in the biological treatment unit which allows for the capacity and power requirements of an aeration system in the biological treatment unit to also be reduced, in some embodiments by about 30%. The reduced size of the components of the treatment system provides for a decreased footprint of the system. For example, a wastewater treatment plant with a capacity to treat 35 million gallons per day (MGD) of wastewater with an influent BOD of 200 mg/L would require about 150,000 ft² of treatment units with a conventional design approach; with embodiments of the present invention the footprint could be reduced to about 75,000 ft².

In other embodiments of systems and methods in accordance with the present invention, a wastewater treatment system, such as any of those described above, may further include an anaerobic treatment unit (an anaerobic digester). Non-limiting examples of components or portions of anaerobic systems that can be utilized in one or more configurations of the wastewater treatment systems include, but are not limited to, the DYSTOR® digester gas holder system, the CROWN® disintegration system, the PEARTH® digester gas mixing system, the PFT® spiral guided digester gas holder, the PFT® vertical guided digester holder, the DUO-DECK™ floating digester cover, and the PFT® heater and heat exchanger system, from Evoqua Water Technologies.

The anaerobic digester may be utilized to treat mixed liquor, which may include suspended solids, sludge, and/or solids-rich or solids-lean fluid streams, from one or more other treatment units of the wastewater treatment system. At least a portion of an anaerobically treated sludge produced in the anaerobic digester may be recycled back to one or more other treatment units of the wastewater treatment system. The nature and function of the anaerobic digester and associated recycle streams may be similar to those described in co-pending U.S. patent application Ser. No. 13/034,269, titled "Hybrid aerobic and anaerobic wastewater and sludge treatment systems and methods," published as US 2011/0203992 A1, which is herein incorporated by reference in its entirety for all purposes.

The systems and components of embodiments of the invention may provide cost advantages relative to other wastewater treatment systems through the use of biological treatment processes in combination with anaerobic digestion. The wastewater treatment systems and processes of embodiments of the present invention can reduce sludge production through the use of various unit operations including aerobic and anaerobic biological processes and recycle streams. The wastewater treatment processes also overcome some of the technical difficulties associated with use of some anaerobic wastewater treatment processes, by, for example, concentrating or strengthening the sludge introduced into the anaerobic digester. Additionally, costs associated with use of a conventional aerobic stabilization unit are typically reduced because less aeration would typically be required in the aerobic processes due to the use of the anaerobic digester and various recycle streams. The various processes can also generate methane as a product of the anaerobic digestion process, which can be used as an energy source. In certain embodiments, a large portion of the chemical oxygen demand (COD) and BOD present in influent wastewater to be treated can be reduced using the anaerobic digester. This can reduce the aeration and oxygen requirements, and thus, operation costs of the wastewater treatment system, and increase the amount of methane produced that can be used as an energy source. Additionally, because anaerobic digestion can be used to reduce COD and BOD in the sludge, the sludge yield can also be reduced. The reduction of COD and/or BOD in the anaerobic treatment unit may also provide for a reduction in size of the stabilization tank or other aerobic treatment unit in the wastewater treatment system as compared to systems not utilizing the anaerobic digester.

Embodiments of the present invention may provide for the recirculation of aerobic bacteria, anaerobic bacteria, or both through various unit operations of the treatment system.

It was previously believed that methanogens were strict anaerobic bacteria that would die quickly in an aerobic environment. Various aspects of the invention, however, involve treatment systems and subsystems, unit operations, and components thereof that accommodate or increase the survivability of methanogenic organisms. One advantageous feature of the treatment systems of the present application involves providing a large amount of methanogens through the anaerobic recycle to a contact stabilization process through the unique internal anaerobic sludge recycle path. At least a portion of the methanogenic bacteria return to the anaerobic digester, thereby seeding the anaerobic digester with methanogenic bacteria to join the existing population of the viable methanogens in the anaerobic digester. This reduces the need for the anaerobic digester to have a size and resultant hydraulic residence time or solids retention time to maintain a stable methanogenic bacteria population in the absence of bacterial seeding, as in previously known processes.

The concentration of seeding methanogenic bacteria, on a basis of a count of microorganisms, provided at the input of the anaerobic digester may in some embodiments be at least a target percentage, such as about 10% or more, of the concentration of the methanogenic bacteria present in the anaerobically digested sludge stream exiting the anaerobic digester. In some embodiments, this percentage may be, for example, about 25% or more, about 33% or more, about 50% or more, or about 75% or more.

The anaerobic digester of systems in accordance with the present invention may be sized smaller than those in previously known systems. The methanogenic bacterial seeding of the anaerobic digester also provides for a safety factor against disruptions of the anaerobic digestion process. In the event of anaerobic digestion process upset or failure, the anaerobic digesters of the presently disclosed systems would recover faster than that the anaerobic digesters in previously known systems because the seeding of the anaerobic digester with methanogenic bacteria would add to the rate of replenishment of methanogenic bacteria in the anaerobic reactor due to the growth of these bacteria therein, reducing the time required for the anaerobic digester to achieve a desired concentration of methanogenic bacteria.

The advantage of methanogen recycle can be estimated as follow:

$$\theta_x = \frac{X_a V}{Q X_a - Q X_a^0}$$

Where
$\theta_x$=Solids retention time in anaerobic digester (days)
$X_a$=concentration of methanogens
$Q$=influent and effluent flow rate
$X_a^0$=concentration of methanogens in the inlet stream, which is normally considered zero for conventional activated sludge process.

If about 50% of methanogens survive in the short solid retention time contact stabilization process and are recycled back to anaerobic digester, the solids retention time of the anaerobic digester could be doubled, or the size of the anaerobic digester decreased by half. For example, in previously known systems a hydraulic retention time in an anaerobic digester was in many instances set at between about 20 and about 30 days. With a treatment system operating in accordance some embodiments of the present application, this hydraulic retention time may be reduced by about 50% to between about 10 and about 15 days.

In some embodiments of the apparatus and methods disclosed herein, a hydraulic retention time in a treatment system contact stabilization vessel may be about one hour or less. A significant portion of methanogens can be recycled in the short solid retention time contact stabilization aerobic process, which can reduce the capital cost and operational cost of the anaerobic digester(s). For example, the tank volume of the anaerobic digester(s) could be decreased to bring the safety factor to a range closer to those anaerobic digester(s) without a methanogen recycle process. With smaller volume, the capital cost of the anaerobic digesters and the mixing energy consumption of the anaerobic digestion process would both decrease, which will make apparatus and processes in accordance with the present disclosure more cost effective than previously known apparatus and processes.

In other embodiments, the seeding of the anaerobic digester with recycled methanogenic bacteria may provide for decreasing the hydraulic residence time of sludge treated in the digester. This would result in a decreased cycle time, and thus an increased treatment capacity of the treatment system. Increasing the amount of methanogens recycled to the anaerobic digester, by, for example, increasing an amount of methanogen-containing sludge directed into the digester, would provide greater opportunity to decrease the hydraulic residence time in the digester and increase the treatment capacity of the system.

If a significant portion of methanogens can be recycled in the aerobic contact stabilization process, the capital cost and operational cost of the anaerobic digesters could be decreased. For example, the tank volume of the anaerobic digesters could be decreased to bring the safety factor to a range closer to those anaerobic digesters in systems not including a methanogen recycle process. With smaller volume, the capital cost of the anaerobic digesters and the mixing energy consumption of the anaerobic digesters will both decrease, which will make the wastewater treatment process more cost effective.

In certain embodiments, the contact tank is constantly seeded with nitrification bacteria (such as ammonia oxidizing and nitrite oxidizing biomass) which can survive the anaerobic digester and which can be recycled back to the aerobic environment. For example, nitrification and de-nitrification can take place in the contact tank. Nitrification may be carried out by two groups of slow-growing autotrophs: ammonium-oxidizing bacteria (AOB), which convert ammonia to nitrite, and nitrite-oxidizing bacteria (NOB), which oxidize nitrite to nitrate. Both are slow growers and strict aerobes. In some embodiments of treatment systems disclosed herein, the nitrification bacteria are introduced to and/or grown in a contact tank, where they are captured in the floc. Some of the nitrification bacteria will pass out from the contact tank and be sent to an anaerobic digester.

It was previously believed that the strictly anaerobic conditions of the anaerobic digester would kill the nitrification bacteria. Various aspects of the invention, however, involve treatment systems and subsystems, unit operations, and components thereof that accommodate or increase the survivability of nitrification organisms in anaerobic and anoxic conditions that may occur in some biological nutrient removal processes. Nitrification bacteria which survive the anaerobic digester and are returned to the aerobic part of the treatment process may enhance the nitrification process performance in ways that can lower capital costs, for example by providing for a reduced aerobic treatment vessel size and/or reduced aerobic treatment hydraulic retention time and/or an increased safety factor that would render the nitrification process more stable in response to disruptions to the treatment process. Disruptions to the treatment process encompass deviations from desired operating parameters which may be caused by, for example, interruptions in flow of material through the treatment system or a loss of temperature control at one or more unit operations. The survival rate of nitrification bacteria in an anaerobic digester could be increased by decreasing a hydraulic residence time in the anaerobic digester, which would be accomplished if the anaerobic digester were seeded with recycled methanogens, as described above.

Figure 4:
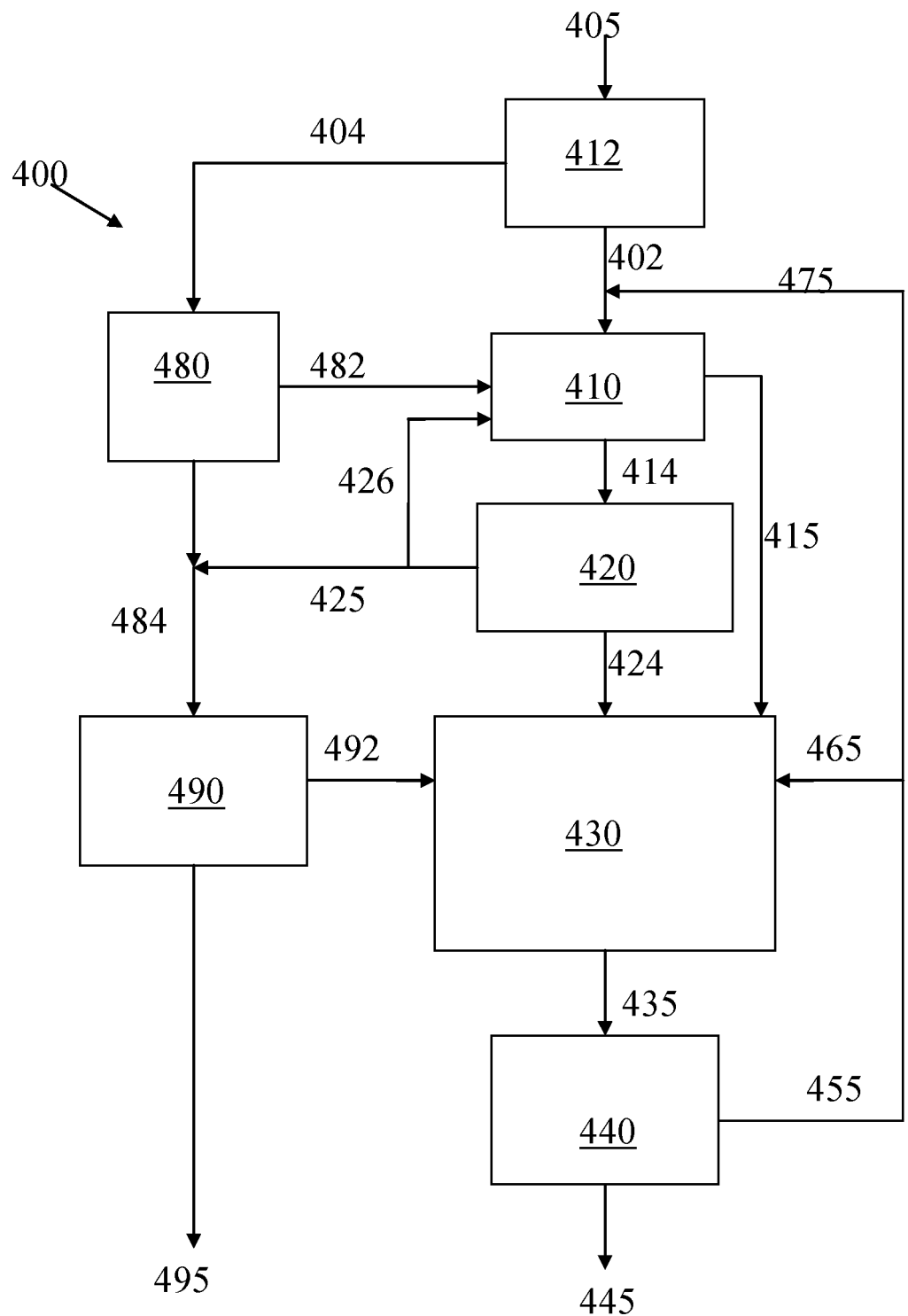
FIG. 4 is a block flow diagram of a wastewater treatment system in accordance with another embodiment of the present invention.

A wastewater treatment system, indicated generally at 400 in FIG. 4, includes an anaerobic treatment unit 490, referred to herein as an anaerobic digester. The wastewater treatment system of FIG. 4 includes a contact tank 410, a DAF unit 420, a stabilization tank 430, a clarifier 440, and associated fluid conduits 414, 424, 435, 445, 455, 465, and 475 which are similar in structure and function to the contact tank 110, DAF unit 120, biological treatment unit 130, clarifier 140, and associated fluid conduits 114, 124, 135, 145, 155, 165, and 175 of the system illustrated in FIG. 1 and described above. A singular DAF unit 420 is illustrated in FIG. 4, although in alternate embodiments the treatment system may use multiple DAF units as described above with reference to the treatment system of FIG. 1.

In the system of FIG. 4, wastewater from a source of wastewater 405 is directed into a primary clarifier 412 through an inlet of the primary clarifier. A solids-rich fluid stream from the clarifier is directed through conduit 404 into an inlet of a thickener 480, which may comprise, for example, a gravity belt thickener. A solids-lean effluent from the primary clarifier 412 is directed into an inlet of the contact tank 410 through conduit 402. A solids-rich output stream from the thickener 480 is directed to an inlet of the anaerobic digester 490 through conduit 484. A solids-lean effluent from the thickener is directed to an inlet of the contact tank 410 through conduit 482. The anaerobic digester is also supplied with suspended solids removed from mixed liquor in the DAF unit 420 through conduits 425 and 484.

In some embodiments, a portion of the suspended solids removed from the mixed liquor in the DAF unit 420 may be recycled to the contact tank 410 through conduits 425 and 426 in a similar manner as the recycle of suspended solids removed in the DAF unit(s) 120 to the contact tank 110 described above with reference to FIG. 1.

The solids-rich output stream from the thickener 480 and any suspended solids from the DAF unit 420 introduced into the anaerobic digester 490 are combined and anaerobically digested in the anaerobic digester. The anaerobic digestion process can be operated at temperatures between about 20° C. and about 75° C., depending on the types of bacteria utilized during digestion. For example, use of mesophilic bacteria typically requires operating temperatures of between about 20° C. and about 45° C., while thermophilic bacteria typically require operating temperatures of between about 50° C. and about 75° C. In certain embodiments, the operating temperature may be between about 25° C. and about 35° C. to promote mesophilic activity rather than thermophilic activity. Depending on the other operating parameters, the retention time in the anaerobic digester can be between about seven and about 50 days retention time, and in some embodiments, between about 15 and about 30 days retention time. In certain embodiments, anaerobic digestion of mixed liquor in the anaerobic digester may result in a reduction in oxygen demand of the mixed liquor of about 50%.

A first portion of an anaerobically digested sludge produced in the anaerobic digester may be recycled through an outlet of the anaerobic digester and into the stabilization tank 430 through conduit 492. This recycle stream may facilitate retaining sufficient solids in the system to provide a desired residence time in the stabilization tank. The anaerobically digested sludge recycled to the stabilization tank may also seed the stabilization tank with nitrification bacteria to enhance the nitrification activity within the stabilization tank as described above. The anaerobically digested sludge recycled into the stabilization tank may also contain methanogenic bacteria which are subsequently returned to the anaerobic digester to enhance the performance of the anaerobic digester as described above.

In embodiments where the stabilization tank 430 includes an aerated anoxic region and an aerobic region, such as in the biological treatment unit 130 of FIG. 2 described above, the portion of the anaerobically digested sludge recycled to the stabilization tank may be directed into the aerated anoxic region of the stabilization tank. A second portion of the anaerobically digested sludge produced in the anaerobic digester may be sent out of the system as waste solids through a conduit 495. The first portion of the anaerobically digested sludge recycled into the stabilization tank 430 may be any amount between about 0% and about 100% of the anaerobically digested sludge produced in and output from the anaerobic digester, with the second portion, making up the balance, sent out of the system as waste solids through conduit 495. In some embodiments, between about 0% and about 80% of the anaerobically digested sludge is recycled from one or more outlets of the anaerobic digester to one or more other unit operations of the treatment system.

Figure 5:
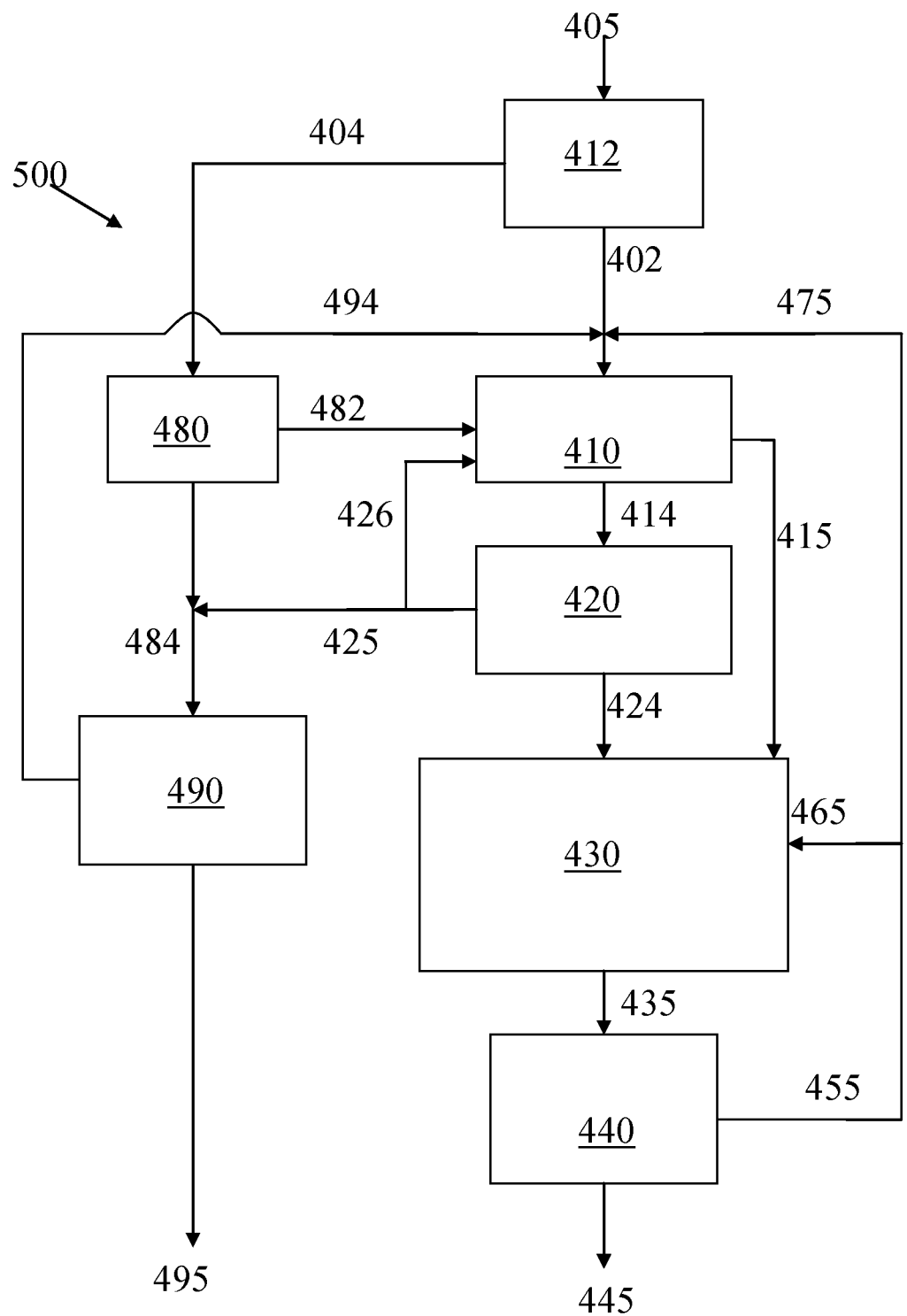
FIG. 5 is a block flow diagram of a wastewater treatment system in accordance with another embodiment of the present invention.

In another embodiment of the wastewater treatment system, indicated generally at 500 in FIG. 5, the first portion of the anaerobically digested sludge produced in the anaerobic digester is recycled through an outlet of the anaerobic digester and into the inlet of the contact tank 410 through conduit 494, rather than into the stabilization tank 430. This recycle stream may facilitate providing sufficient activated sludge in the contact tank to absorb/absorb or enmesh BOD present in the influent wastewater. The anaerobically digested sludge recycled to the contact tank may also seed the contact tank with nitrification bacteria to enhance the nitrification activity within the contact tank as described above. The anaerobically digested sludge recycled into the contact tank may also contain methanogenic bacteria which are subsequently returned to the anaerobic digester to enhance the performance of the anaerobic digester as described above. The first portion of the anaerobically digested sludge recycled into the contact tank 410 may be any amount between about 0% and about 100% of the anaerobically digested sludge produced in and output from the anaerobic digester, with a second portion, making up the balance, sent out of the system as waste solids through conduit 495.

Figure 6:
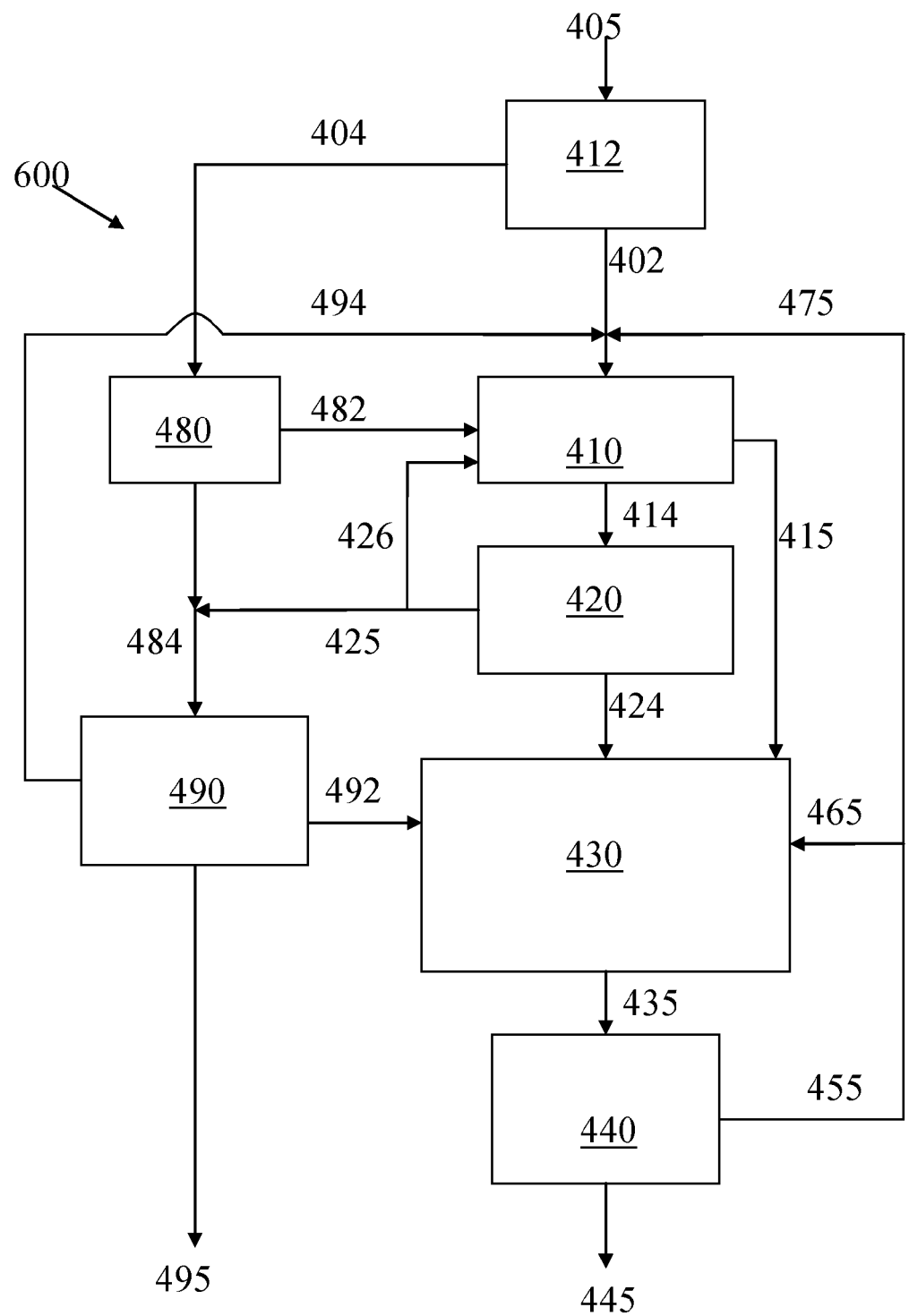
FIG. 6 is a block flow diagram of a wastewater treatment system in accordance with another embodiment of the present invention.

In another embodiment of the wastewater treatment system, indicated generally at 600 in FIG. 6, a first portion of the anaerobically digested sludge produced in the anaerobic digester may be recycled through an outlet of the anaerobic digester and into the inlet of the contact tank 410 through conduit 494, and a second portion of the anaerobically digested sludge may be recycled through an outlet of the anaerobic digester and into the stabilization tank 430 through conduit 492. These recycle streams may provide the benefits described above with regard to systems 400 and 500. A third portion of the anaerobically digested sludge may be directed to waste through conduit 495. The sum of the first portion of the anaerobically digested sludge and the second portion of the anaerobic sludge may be any amount between about 0% and about 100% of the anaerobically digested sludge produced in and output from the anaerobic digester, with the third portion, making up the balance, sent out of the system as waste solids through conduit 495. The recycled anaerobic sludge may be split in any desired ratio between the first portion and the second portion. The first portion may comprise from about 0% to about 100% of all the anaerobically digested sludge produced in and output from the anaerobic digester with the sum of the second portion and the third portion making up the balance.

Figure 7:
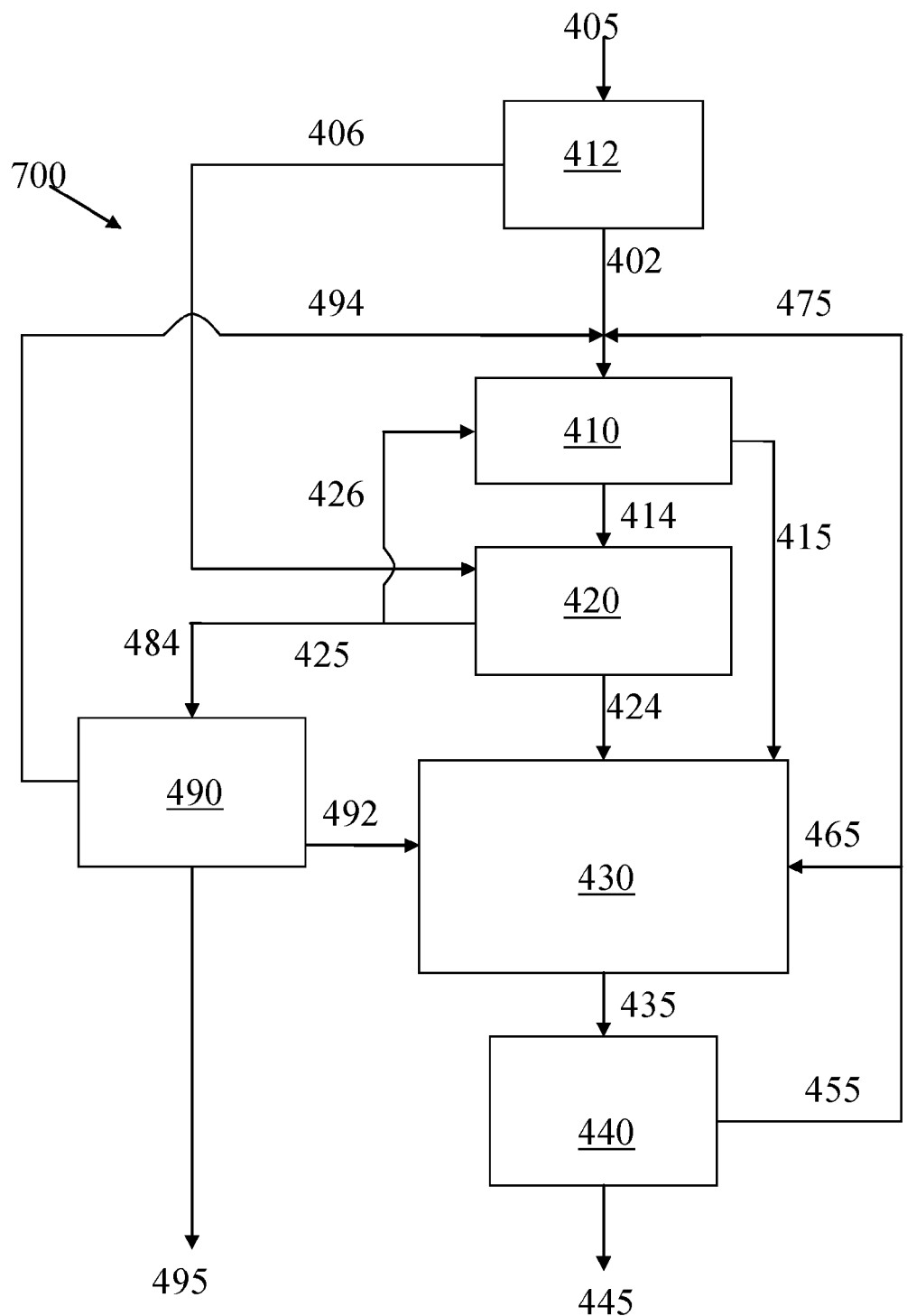
FIG. 7 is a block flow diagram of a wastewater treatment system in accordance with another embodiment of the present invention.

Another embodiment of the wastewater treatment system, indicated generally at 700 in FIG. 7, is similar to that illustrated in FIG. 6, however the thickener 480 is not utilized. Rather, the solids-rich fluid stream from the clarifier is directed through conduit 406 into an inlet of the DAF unit 420. The DAF unit 420 of the system illustrated in FIG. 7 performs the function of the thickener 480 of the system illustrated in FIG. 6. The utilization of the DAF unit 420 to perform the function of the thickener may reduce or eliminate the need for a thickener in the system, which may reduce both capital and operational costs of the system. A first portion of the anaerobically digested sludge created in the anaerobic digester 490 is recycled to the contact tank 410 and a second portion is recycled to the stabilization tank 430 to provide the benefits described above. A third portion of the anaerobically digested sludge is directed to waste through conduit 495.

Further embodiments may include any combination of features of the systems described above. For example, in some embodiments, a first portion of the solids-rich fluid stream from the clarifier is directed through conduit 406 into an inlet of the DAF unit 420, while a second portion is directed into a thickener 480. In any of the above embodiments, the stabilization tank 430 may include an aerated anoxic region and an aerobic region. A first portion of the anaerobically digested sludge recycled to the stabilization tank may be directed into the aerated anoxic region of the stabilization tank and a second portion may be recycled to the aerobic region. The ratio the amount of recycled anaerobic sludge directed to the aerated anoxic region to the amount of recycled anaerobic sludge directed to the aerobic region may be any ratio desired. Any of the above embodiments may include multiples of any of the treatment units and/or conduits illustrated.

EXAMPLES

Example 1

Figure 10:
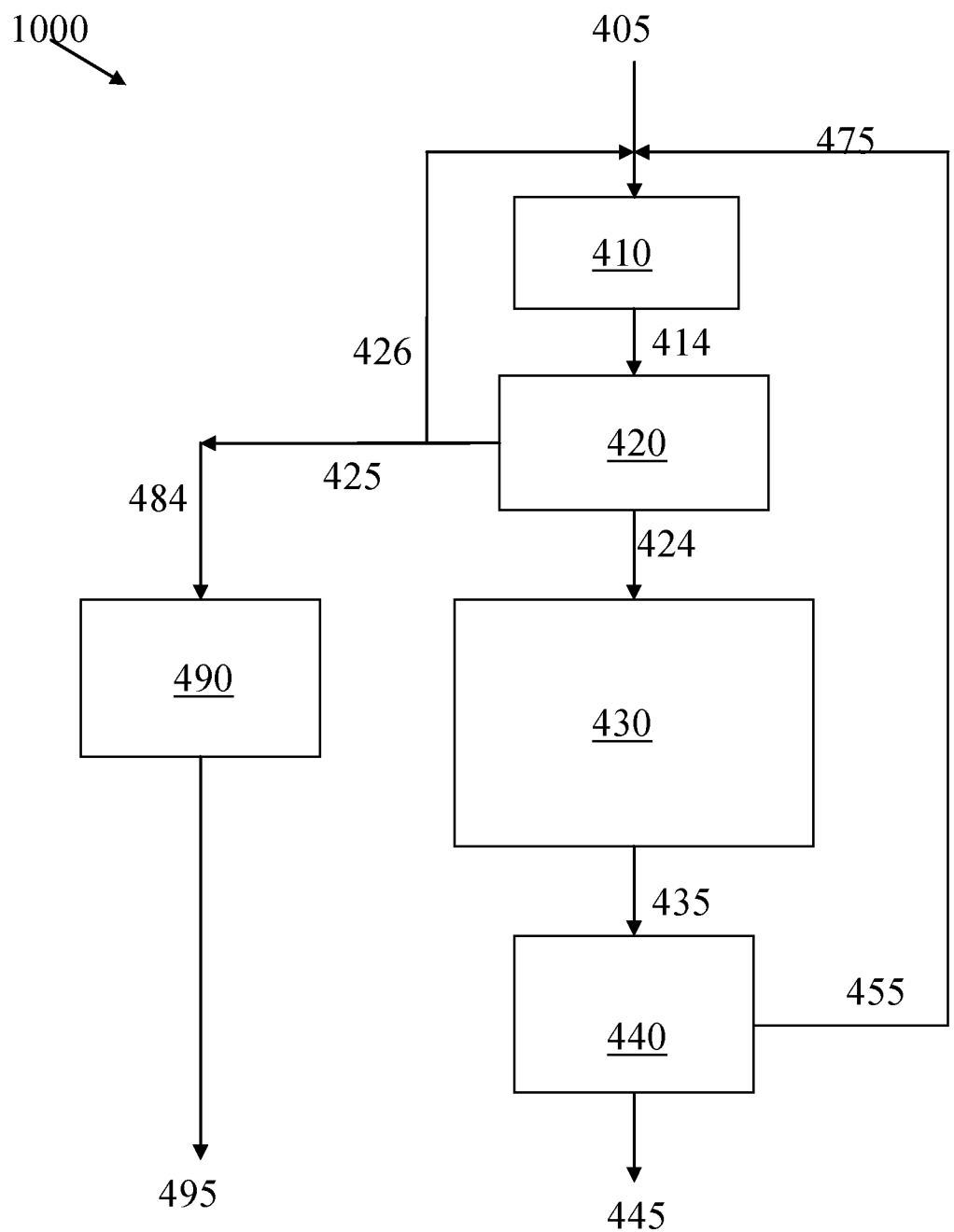
FIG. 10 is a block flow diagram of a wastewater treatment system in accordance with another embodiment of the present invention.
Figure 11:
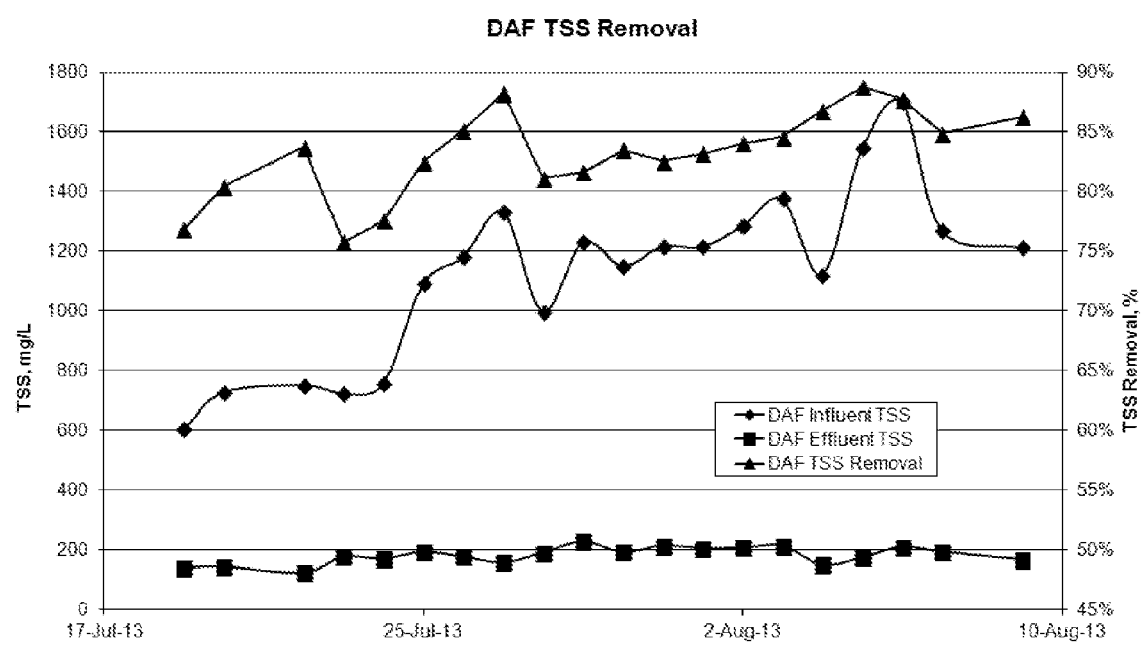
FIG. 11 illustrates a first set of results of a test of a system in accordance with an embodiment of the present invention.
Figure 12:
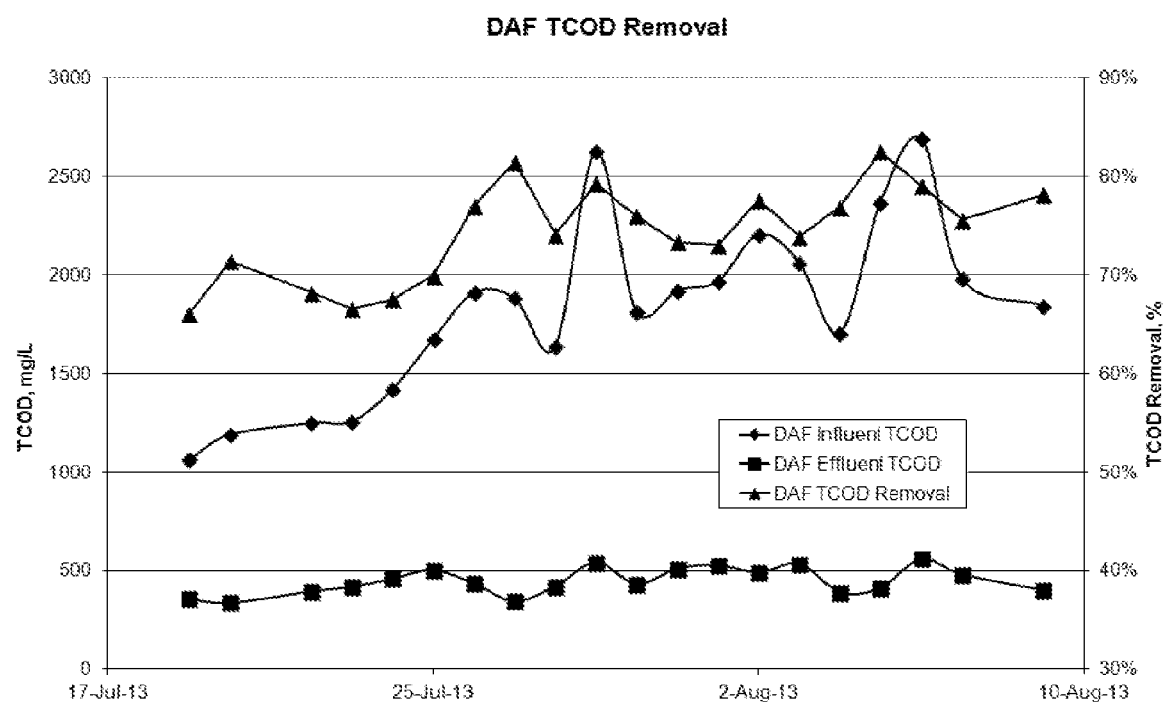
FIG. 12 illustrates a second set of results of a test of a system in accordance with an embodiment of the present invention.

A wastewater treatment system 1000 was configured as illustrated in FIG. 10, where the indicated unit operations and conduits have the same structure and function as the identically indicated unit operations and conduits in FIGS. 4-7. The wastewater treatment system 1000 was used to examine the effects of recycling removed solids from the DAF unit 420 to the contact tank 410. By gradually increasing the amount of removed solids from the DAF unit 420 recycled to the contact tank 410 from 0% of the solids removed in the DAF unit to about 90% of the solids removed in the DAF unit over the course of three weeks, the suspended solids (MLSS) content of contact tank was brought up from 600 mg/L to over 1200 mg/L. The DAF dissolved solids content increased from 3%-4% prior to beginning the recycle of solids from the DAF unit to the contact tank to above 5% after beginning the recycle of solids from the DAF unit to the contact tank. The total suspended solids (TSS) removal efficiency of the DAF unit increased from about 75% to over 85%. The COD removal of the DAF unit increased from about 70% to about 80% over the course of the testing. These results are illustrated in the charts of FIG. 11 and FIG. 12.

These results show that recycling removed solids from a DAF unit to a contact tank in a system such as that illustrated in FIG. 10 may provide for a greater amount of suspended solids in the contact tank. The increased amount of suspended solids in the contact tank increases the amount of suspended and soluble COD and BOD which may be removed from wastewater influent to the contact tank and absorbed/adsorbed/enmeshed in the suspended solids and/or which may be oxidized in the contact tank. Recycling removed solids from a DAF unit to a contact tank in a system such as that illustrated in FIG. 10 increases the efficiency of the removal of suspended solids in the DAF unit. These effects may decrease the load on downstream unit operations and may reduce operating costs of the system as a whole and/or may reduce capital costs of the system by providing for smaller downstream processing units to be utilized. Further, a greater amount soluble BOD/COD from wastewater influent to the system may be removed as solids in the DAF unit and may be sent from the DAF unit to an anaerobic digester instead of an aerobic treatment unit operation, reducing the aeration power requirements of the system and increasing the amount of biogas that could be produced.

Prophetic Example 1

In this prophetic example, a water treatment system was configured as illustrated in FIG. 1 with the biological treatment unit 130 comprising a single tank.

Assumptions of Feed:

The system was fed wastewater at a rate of 57,600 gallons/day (gpd), 40 gallons per minute (gpm). The wastewater was assumed to be typical of municipal wastewater, having a total BOD (tBOD) of 140 mg/l (67 lbs/day) of which 43% (60 mg/l, 29 lbs/day) was particulate (non-soluble) BOD (pBOD), and 57% (80 mg/l, 38 lbs/day) was soluble BOD (sBOD). The wastewater was also assumed to include 100 mg/l (48 lbs/day) of suspended solids (SS), of which 19 lbs/day (48 lbs/day SS−29 lbs/day pBOD) was assumed to be inert (non-biological) material, and 6 lbs/day of ammonia.

HDT Assumptions:

The hydraulic detention time (HDT) in the contact tank 110 was assumed to be 45 minutes and the hydraulic detention time (HDT) in the biological treatment unit 130 was assumed to be five hours.

Flow Rate Through Contact Tank:

The ratio of return sludge sent from the clarifier 140 to the contact tank was set at 2.4 lb/lb of tBOD, for a (2.4)(67 lbs/day tBOD)=160 lbs/day recycled sludge or 2,880 gpd (2.0 gpm), assuming a recycled sludge solids loading of 6,660 mg/l. The total flow through the contact tank was thus 57,600 gpd+2,880 gpd=60,480 gpd (42 gpm).

From laboratory bench scale testing, it was found that in the contact tank, approximately 50% of the sBOD was removed, with approximately ⅔ of the amount removed converted to SS, and approximately ⅓ of the amount removed oxidized, for example, converted to carbon dioxide and water. Thus, it was assumed that in the contact tank 14 lbs/day of sBOD was converted to SS and 5 lbs/day of pBOD was oxidized. The total solids passed through the contact tank was thus 160 lbs/day recycled sludge+48 lbs/day suspended solids from influent wastewater+14 lbs/day sBOD converted to SS−5 lbs pBOD oxidized=217 lbs/day. The mixed liquor suspended solids (MLSS) leaving the contact tank was thus ((217 lbs/day)/(60,480 gpd)) (453592.4 mg/lb)(0.2641721 gal/l)=430 mg/l.

The tBOD leaving the contact tank was 67 lbs/day input−5 lbs/day oxidized=62 lbs/day (121 mg/l). The sBOD leaving the contact tank was 38 lbs/day in−14 lbs/day converted to SS−5 lbs/day oxidized=19 lbs/day (37 mg/l). The pBOD leaving the contact tank was 29 lbs/day influent+14 lbs/day converted from sBOD=43 lbs/day (84 mg/l).

Flow Split into DAF and Biological Treatment Tank:

The flow out of the contact tank was split between the DAF units 120 and the biological treatment unit 130. 46.5% (101 lbs/day, 28,080 gpd, 19.5 gpm) of the output of the contact tank was directed to the DAF units and 53.5% (116 lbs/day, 32,400 gpd, 22.5 gpm) was directed into the biological treatment unit.

It was assumed that all recycled sludge directed to the DAF units (160 lbs/day introduced into contact tank−116 lbs/day returned to biological treatment tank=44 lbs/day) was removed in the DAF process.

BOD Influent to Biological Treatment Unit:

The total BOD to be treated in the biological treatment unit includes the BOD from the contact tank (53.5% of 62 lbs/day=33 lbs/day) in 32,400 gpd of influent plus BOD from the DAF units. The pBOD influent to the DAF units was 46.5% of 43 lbs/day output from contact tank=20 lbs/day. The sBOD influent to the DAF units was 46.5% of 19 lbs/day output from the contact tank=9 lbs/day at a flow rate of 28,800 gpd. Assuming 80% of the pBOD was removed in the DAF units, the tBOD flowing from the DAF units to the biological treatment tank was (0.2*20 lbs/day pBOD)+9 lbs/day sBOD=13 lbs/day tBOD. Thus the total influent BOD to the biological treatment tank was 33 lbs/day from the contact tank+13 lbs/day from the DAF units=46 lbs/day.

Solids in Biological Treatment Tank:

The biological treatment unit was sized to accommodate a BOD loading of 29 lbs/1000 ft$^3$, a common loading in the industry. This meant that the volume of the biological treatment unit was (46 lbs/day influent tBOD)/(29 lbs/1000 ft$^3$ tBOD loading)=1,600 ft$^3$ (12,000 gal). This volume resulted in a HDT in the biological treatment unit of (12,000 gal/57,600 gpd)(24 hr/day)=5 hours. The total solids in the biological treatment unit was set at 220 lbs, for a total MLSS of (220 lbs/12,000 gal)(0.264 gal/l)(453,592 mg/lb)=2200 mg/l. Assuming a sludge yield of 95% of the BOD results in an amount of waste sludge produced in the biological treatment unit of (0.95)(46 lbs/day tBOD)=44 lbs/day waste sludge. The waste sludge age would thus be (220 lbs total solids)/(44 lbs/day waste sludge)=5.2 days.

Biological Treatment Tank Oxygen Requirements:

It was assumed that 0.98 lbs of oxygen were required to oxidize a pound of BOD and 4.6 lbs of oxygen were required to oxidize a pound of ammonia. The oxygen requirement of the biological treatment unit was thus (0.98 lbs $O_2$/lb BOD) (46 lbs tBOD/day)+(4.6 lbs $O_2$/lb ammonia)(6 lb/day ammonia)=72.6 lb/day $O_2$ (3 lb $O_2$/hr). Using a FCF (Field Correction Factor—a correction factor to compensate for the reduced oxygen absorbing ability of mixed sludge in the biological treatment tank as opposed to clean water) of 0.5, this results in a specific oxygen utilization rate (SOUR) of 6 lbs $O_2$/hr. Assuming diffused air was supplied to the biological treatment tank from a aeration system submerged by nine feet and a 6% oxygen transfer capability (OTE), the biological treatment unit would require a flow of (6 lbs $O_2$/hr)(1/0.06)(1/60 hour/min)(1/1.429 l/g $O_2$)(453.6 g/lb) (0.035 ft$^3$/l)=18.5 ft$^3$/min (scfm), or if aerating with air with approximately 20% $O_2$, 92.6 scfm.

Clarifier:

The clarifier was assumed to have a 61 ft$^2$ volume. 57,600 gpd flowed into the clarifier, resulting in an overflow of 57,600 gpd/61 ft$^2$=944 gallon per ft$^2$ per day (gpsfd) overflow rate. Assuming an MLSS of 2200 mg/l from the biological treatment tank and targeting a recycled sludge (RAS) concentration of 6600 mg/l and 50% of overflow recycled as RAS gives a RAS flow rate of 20 gpm (28,800 gpd). It was assumed that 18 gpm RAS was recycled to the biological treatment tank and 2 gpm to the contact tank. The solids loading of the clarifier was thus (57,600 gpd influent wastewater+28,800 gpd RAS)(2200 mg/l MLSS)(1/453592.4 lb/mg)(3.79 l/gal)/(61 ft$^2$)=(1588 lbs/day)/(61 ft$^2$) =26 lb/ft$^2$·day.

Solids Wasted:

Solids wasted in DAF units: 101 lbs/day (assuming 100% efficiency).

Ratio of sludge wasted to BOD treated: (101 lbs/day)/(67 lbs/day tBOD in wastewater influent)=1.5

With the addition of the DAF units to the treatment system in the above example, the amount of tBOD to be treated in the biological treatment tank was reduced from 62 lbs/day to 46 lbs/day, a reduction of 26%. This provided for a reduced required size for the biological treatment tank to obtain a desired solids loading and resulted in a decrease in the required amount of air needed to treat this tBOD in the biological treatment tank. This would translate into a cost savings for both capital costs, for a reduced size of the biological treatment tank and aeration system, as well as a decreased operating cost due to the reduced amount of aeration required.

Prophetic Example 2

A simulation was performed using BIOWIN™ simulation software (EnviroSim Associates Ltd., Ontario, Canada) to compare the performance of a wastewater treatment system in accordance with an embodiment of the present invention with and without an anaerobic sludge recycle.

Figure 8:
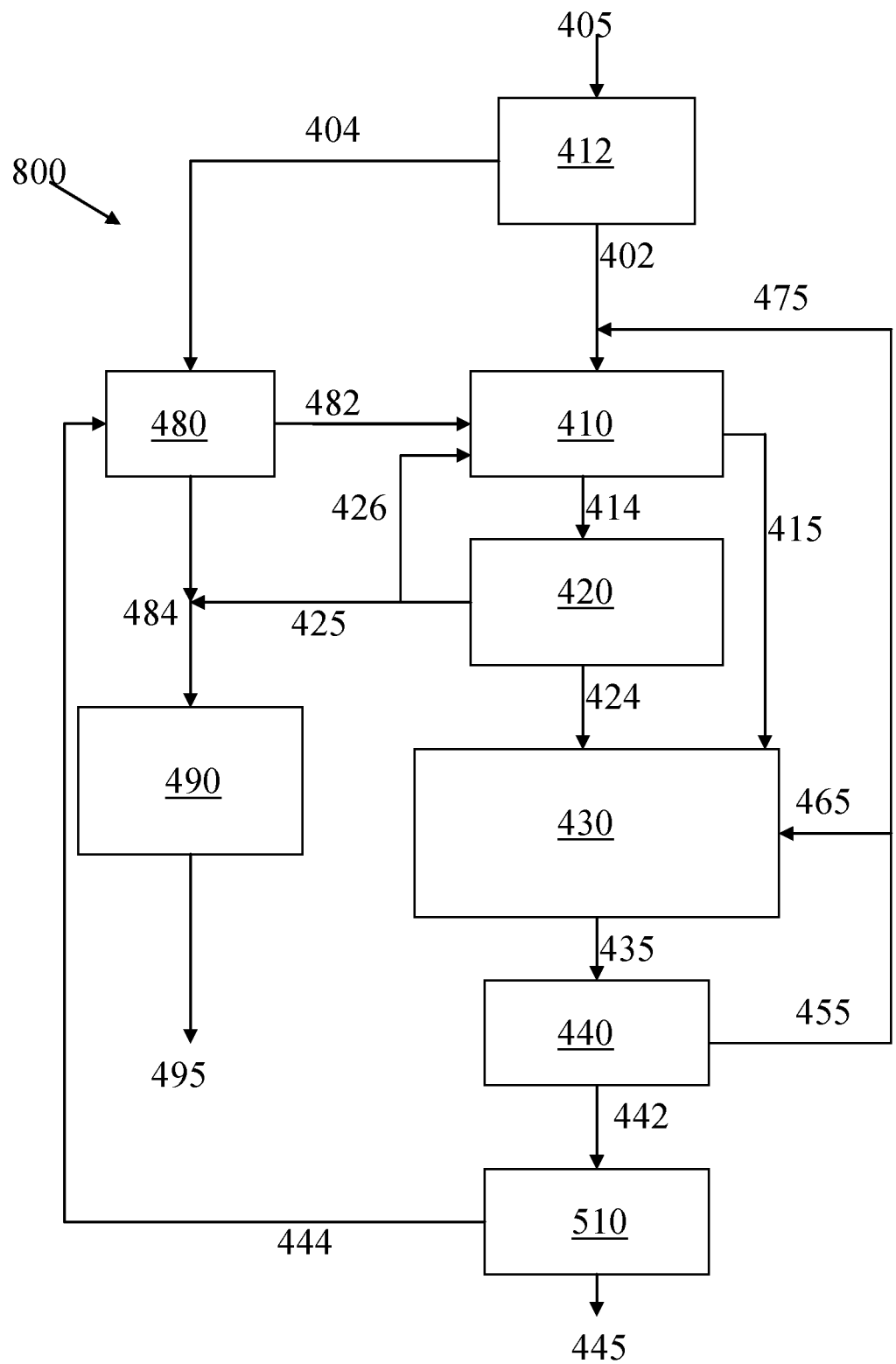
FIG. 8 is a block flow diagram of a wastewater treatment system in accordance with another embodiment of the present invention.

The wastewater treatment system without the anaerobic sludge recycle included was configured as illustrated in FIG. 8, indicated generally at 800. This system is similar to that illustrated in FIG. 4, but with no anaerobic sludge recycle conduit 492 and with the addition of a membrane bioreactor (MBR) 510 which receives a solids lean effluent from the clarifier 440 through conduit 442. The MBR produces a product water permeate which is removed from the system through conduit 445, and a solids-rich retentate, which is recycled to the DAF unit 480 through conduit 444. The MBR 510 was simulated to perform complete nitrification of the solids lean effluent from the clarifier 440.

Figure 9:
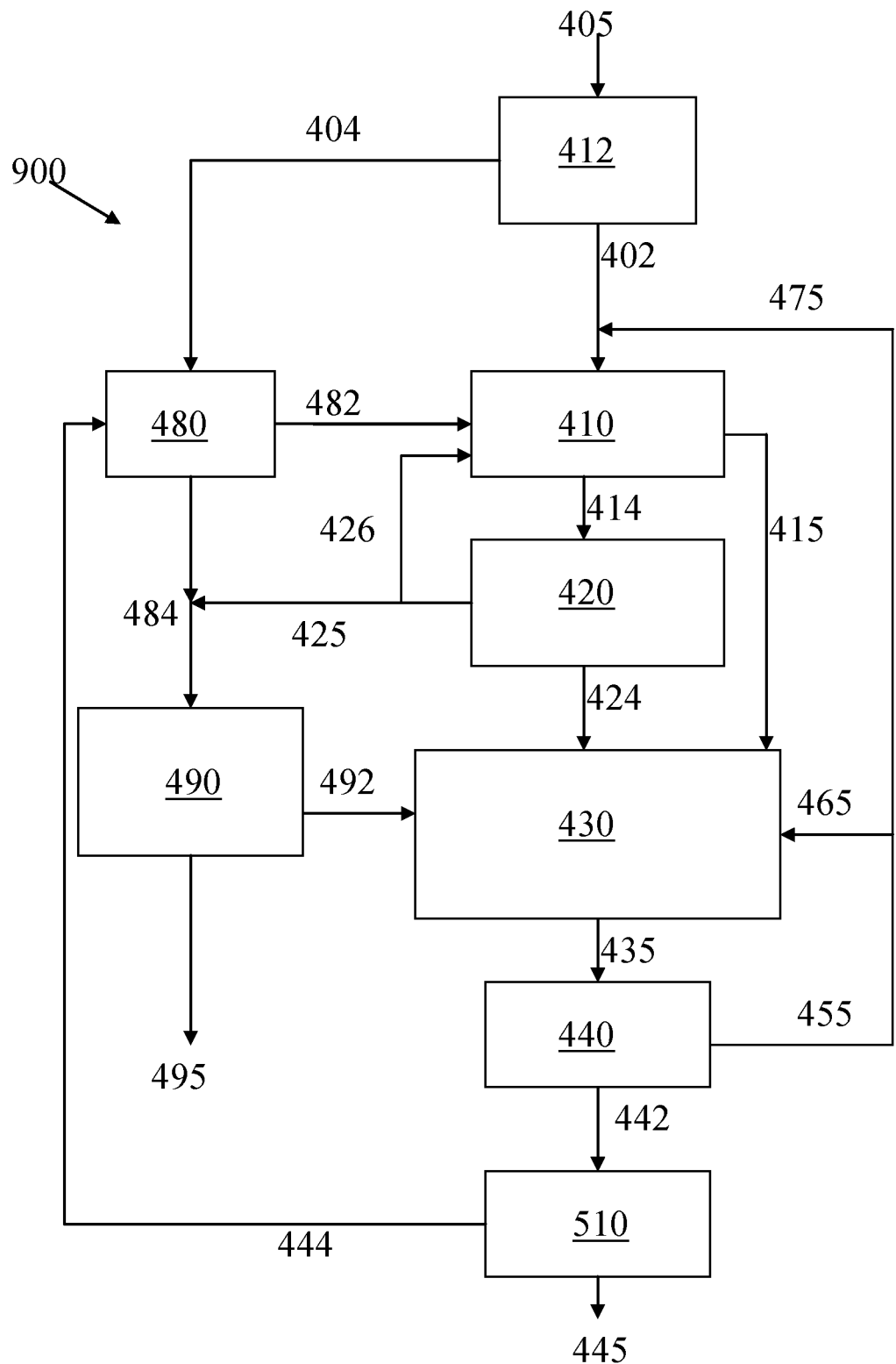
FIG. 9 is a block flow diagram of a wastewater treatment system in accordance with another embodiment of the present invention.

The performance of the wastewater treatment of FIG. 8 was simulated and compared to the simulated performance of the wastewater treatment system 900 of FIG. 9. Wastewater treatment system 900 of FIG. 9 is similar to wastewater treatment system 800 of FIG. 8, but with the addition of an anaerobic sludge recycle conduit 492 recycling anaerobically digested sludge from the anaerobic digester 490 to the stabilization tank 430 though conduit 492. In the simulation of the wastewater treatment system 900, 45% of the anaerobically digested sludge output from the anaerobic digester 490 was recycled to the stabilization tank 430, and 55% of the anaerobically digested sludge output from the anaerobic digester 490 was sent to waste.

The simulation of the performance of both systems 800 and 900 assumed an influent wastewater flow rate of 100 MGD. The influent wastewater was assumed to have a COD of 500 mg/L, a total suspended solids (TSS) of 240 mg/L, a Total Kjeldahl Nitrogen (TKN) of 40 mg/L, and a temperature of 15° C.

The results of the simulation indicated that the anaerobically digested sludge recycle of the system 900 resulted in a decrease in the total oxygen requirement for treating the influent wastewater as compared to the system 800 of from 113,891 kg $O_2$/day to 102,724 kg $O_2$/day, a savings of about 10%. Assuming an oxygen transfer energy requirement of 1.5 kg $O_2$/kwh, this reduction in oxygen consumption would reduce the power requirements associated with providing the oxygen from 75,988 kwh/day to 68,483 kwh/day, a savings of 7,515 kwh/day.

The results of the simulation indicated that the anaerobically digested sludge recycle of the system 900 resulted in an increase in the amount of methane produced as compared to the system 800 from 1,348 scfm to 1,652 scfm, an increase of about 23%. Assuming that 35% of the methane chemical energy could be converted to electricity, the potential electricity generation from the methane produced would increase from 104,511 kwh/day to 128,989 kwh/day.

Combining the energy reduction from the reduced oxygen requirement with the energy gain from the increased methane production results in an energy savings of about 31,982 kwh/day for the system 900 including the anaerobically digested sludge recycle as compared to the system 800 without the anaerobically digested sludge recycle.

The results of the simulation also indicated that adding the anaerobically digested sludge recycle of the system 900 to the system 800 resulted in a reduction in biomass (sludge) production from 81,003 pounds per day to 61,167 pounds per day, a reduction of about 25%.

This simulation data indicates that the addition of an anaerobically digested sludge recycle to wastewater treatment systems in accordance with the present invention may result in a significant reduction in power consumption and a significant decrease in waste sludge production, both of which would result in cost savings and enhanced environmental-friendliness of the wastewater treatment system.

Prophetic Example 3

Calculations were performed to compare the performance of a wastewater treatment system in accordance with an embodiment of the present invention with and without a recycle of solids removed in a DAF unit of the system to a contact tank of the system. The wastewater treatment system was configured as illustrated in FIG. 10.

It was assumed that the system was provided with 40 million gallons per day of wastewater influent with a BOD level of 250 mg/L (83,400 lbs/day) and suspended solids of 252 mg/L (84,000 lbs/day).

It was assumed that the biological treatment tank 430 operated with a solids retention time (SRT) of 5 days, a mixed liquor suspended solids (MLSS) concentration of 3,000 mg/L and a BOD loading of 45 lbs/1,000 cubic feet (20.4 kg/28.3 cubic meters) and that all solids separated in the clarifier 440 were recycled to the contact tank 410. The hydraulic detention time (HDT) of the contact tank 410 was assumed to be 25 minutes for the system operating without the DAF to contact tank solids recycle and one hour for the system operating with the DAF to contact tank solids recycle. The increase in HDT in the contact tank for the system when operating with the DAF to contact tank solids recycle was to provide for the increased MLSS in the contact tank to adsorb additional soluble BOD in the contact tank as compared to the system operating without the DAF to contact tank solids recycle. For the system operating with a recycle of solids from the DAF unit to the contact tank, it was assumed that the DAF unit removed 308,000 lbs/day (139,706 kg/day) of solids from the mixed liquor passing through it and recycled 190,000 lbs/day (86,183 kg/day, 62% of the solids removed) to the contact tank while directing 118,000 lbs/day (53,524 kg/day) of solids to the anaerobic digester 490.

A comparison of the results of the calculations comparing the system with and without the DAF to contact tank solids recycle is illustrated in Table 1 below:

TABLE 1

| Parameter | System operated without DAF → Contact tank recycle | System with 62% DAF → Contact tank recycle |
|---|---|---|
| BOD treated in biological treatment tank (lbs/day) | 41,200 (18,688 kg/day) | 20,600 (9,344 kg/day) |
| Aeration energy (both contact tank and biological treatment tank, kW) | 600 | 410 |
| Solids to anaerobic digester (lbs/day) | 103,000 (46,720 kg/day) | 115,000 (52,163 kg/day) |
| Solids destroyed (lbs/day) | 43,900 (19,913 kg/day) | 55,900 (25,356 kg/day) |
| Biogas produced (mcfd/day) | 0.66 (18,633 cubic meters/day) | 0.84 (23,730 cubic meters/day) |
| Biogas energy (assuming 40% conversion efficiency, kW) | 1,880 | 2,390 |
| Net energy gain (kW) | 1,280 | 1,880 |

These results show that providing a wastewater treatment system as configured in FIG. 10 with a recycle of solids removed in a DAF unit to a contact tank can significantly reduce the energy required to operate the system as compared to an equivalent system without the recycle of solids from the DAF unit to the contact tank. Adding the DAF to contact tank solids recycle results in less BOD being sent for treatment in the biological treatment tank (a reduction of (41,200−20,600)/41,200=50% in the present example) which lowers the need for aeration in the biological contact tank. A greater amount of biogas ((0.84−0.66)/0.66=27% more in the present example) is produced when adding the DAF to contact tank solids recycle to the system. The combined gain in biogas production and decrease in aeration energy requirements results in a net energy gain of 1,880−1,280=600 kW when adding the DAF to contact tank solids recycle to the system. At an estimated $0.10/kW energy cost, this net energy gain would yield a cost savings of about $530,000 per year.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A wastewater treatment system comprising:
   a contact tank having an first inlet configured to receive wastewater to be treated, a second inlet configured to receive activated sludge, and an outlet, the contact tank configured to mix the wastewater to be treated with the activated sludge to form a first mixed liquor;
   a dissolved air flotation unit having an inlet in fluid communication with the outlet of the contact tank, the dissolved air flotation unit configured to separate suspended matter from a portion of the first mixed liquor to form a solids-lean dissolved air flotation unit effluent and waste solids, to output the waste solids through a solids outlet of the dissolved air flotation unit, and to output the solids-lean dissolved air flotation unit effluent through an effluent outlet of the dissolved air flotation unit;
   a biological treatment unit having a first inlet in fluid communication with the effluent outlet of the dissolved air flotation unit, a second inlet, and an outlet, the biological treatment unit configured to biologically break down organic components of the effluent from the dissolved air flotation unit to form a second mixed liquor;
   a clarifier having an inlet in fluid communication with the outlet of the biological treatment unit, an effluent outlet, and a return activated sludge outlet, the clarifier configured to output a clarified effluent through the effluent outlet and a return activated sludge though the return activated sludge outlet;
   a dissolved air flotation unit effluent conduit extending between the effluent outlet of the dissolved air flotation unit and the first inlet of the biological treatment unit; and
   a return activated sludge conduit extending between the return activated sludge outlet of the clarifier and the second inlet of the biological treatment unit.

2. The system of claim 1, wherein the biological treatment unit includes regions separated by a partition.

3. The system of claim 1, comprising a first sub-system including the contact tank and the dissolved air flotation unit which is physically separated from a second sub-system including the biological treatment unit.

4. The system of claim 1, including a plurality of dissolved air flotation units operating in parallel.

5. The system of claim 1, wherein the biological treatment unit includes an aerobic region.

6. A method of treating wastewater comprising:
   introducing the wastewater into a contact tank including an activated sludge;
   mixing the wastewater with activated sludge in the contact tank to form a first mixed liquor;
   directing the first mixed liquor to a dissolved air flotation unit;
   separating the first mixed liquor in the dissolved air flotation unit to form a solids-lean dissolved air flotation unit effluent and waste biosolids;
   directing the solids-lean dissolved air flotation unit effluent to a biological treatment unit;
   biologically treating the solids-lean dissolved air flotation unit effluent in the biological treatment unit to form a biologically treated mixed liquor;
   directing the biologically treated mixed liquor to a clarifier;
   separating the biologically treated mixed liquor in the clarifier to form a clarified effluent and a return activated sludge;

recycling a portion of the return activated sludge to the biological treatment unit; and directing the clarified effluent to a treated wastewater outlet.

7. The method of claim 6, wherein the dissolved air flotation unit removes between about 60% and about 100% of suspended solids in the first mixed liquor as waste biosolids.

8. The method of claim 7, wherein an amount of suspended solids removed in the dissolved air flotation unit is adjusted based upon a concentration of a bacteria in the biological treatment unit.

9. The method of claim 6, wherein the dissolved air flotation unit removes between about 40% and about 80% of biological oxygen demand in the first mixed liquor.

10. The method of claim 6, further comprising dosing the first mixed liquor with a coagulant.

11. The method of claim 10, wherein dosing the first mixed liquor with a coagulant includes dosing the first mixed liquor with ferric chloride.

12. The method of claim 6, wherein biologically treating the solids-lean dissolved air flotation unit effluent in the biological treatment unit includes aerobiacally treating the solids-lean dissolved air flotation unit effluent.

13. A method of facilitating increased operating efficiency of a wastewater treatment system comprising:

providing a dissolved air flotation unit in a wastewater treatment system in fluid communication between a contact tank and a biological treatment unit, the dissolved air flotation unit configured to separate a portion of a first mixed liquor output from the contact tank to form a solids-lean dissolved air flotation unit effluent and waste solids, and to direct the solids-lean dissolved air flotation unit effluent into the biological treatment unit, the dissolved air flotation unit reducing the amount of biological oxygen demand to be treated in the biological treatment unit as compared to the wastewater treatment system operating in the absence of the dissolved air flotation unit; and fluidly connecting a return activated sludge recycle conduit between a downstream solids-liquid separation unit and the biological treatment unit, the return activated sludge recycle conduit configured to recycle return activated sludge formed in the solids-liquid separation unit from a mixed liquor output from the biological treatment unit to the biological treatment unit.

14. The method of claim 13, further comprising reducing a rate of aeration of the biological treatment unit as compared to a rate of aeration of the biological treatment unit prior to providing the dissolved air flotation unit.

* * * * *